United States Patent
Kato et al.

(10) Patent No.: US 8,073,266 B2
(45) Date of Patent: Dec. 6, 2011

(54) DYNAMIC IMAGE ENCODING DEVICE, DYNAMIC IMAGE DECODING DEVICE, DYNAMIC IMAGE ENCODING METHOD, DYNAMIC IMAGE DECODING METHOD, DYNAMIC IMAGE ENCODING PROGRAM, AND DYNAMIC IMAGE DECODING PROGRAM

(75) Inventors: Sadaatsu Kato, Yokosuka (JP); Choong Seng Boon, Yokohama (JP); Tsutomu Horikoshi, Kamakura (JP); Thiow Keng Tan, Singapore (SG)

(73) Assignee: NTT DoCoMo, Inc., Tokyo (JP)

( * ) Notice: Subject to any disclaimer, the term of this patent is extended or adjusted under 35 U.S.C. 154(b) by 743 days.

(21) Appl. No.: 12/090,154

(22) PCT Filed: Oct. 12, 2006

(86) PCT No.: PCT/JP2006/320384
§ 371 (c)(1),
(2), (4) Date: Aug. 12, 2008

(87) PCT Pub. No.: WO2007/043613
PCT Pub. Date: Apr. 19, 2007

(65) Prior Publication Data
US 2009/0257665 A1 Oct. 15, 2009

(30) Foreign Application Priority Data
Oct. 12, 2005 (JP) ................ P2005-298169

(51) Int. Cl.
*G06K 9/36* (2006.01)
(52) U.S. Cl. ............... 382/232; 375/240.12; 375/240.16
(58) Field of Classification Search .................. None
See application file for complete search history.

(56) References Cited

U.S. PATENT DOCUMENTS

| 6,697,061 B1 | 2/2004 | Wee et al. |
| 2005/0036552 A1 | 2/2005 | Takahashi et al. |
| 2005/0201464 A1 | 9/2005 | Lee |

(Continued)

FOREIGN PATENT DOCUMENTS

EP 1 578 135 A2 9/2005

(Continued)

OTHER PUBLICATIONS

Murakami T. et al., "H. 264/AVC Baseline Profile ni Okeru Hoko Izonsei o Riyo Shita Kakucho Fugoka Hoshiki", The Institute of Electronics, Information and Communication Engineers Sogo Taikai Koen Ronbunshu, pp. D-11-49, p. 49, 2005.

(Continued)

*Primary Examiner* — Claire X Wang
*Assistant Examiner* — Siamak Harandi
(74) *Attorney, Agent, or Firm* — Oblon, Spivak, McClelland, Maier & Neustadt, L.L.P.

(57) ABSTRACT

An image encoding device including an input section inputting an input image constituting an encoding target; a reference image accumulation section accumulating a reference image; a reference image accompanying information accumulation section accumulating reference image accompanying information that accompanies the reference image; an encoding section modifying the reference image and the reference image accompanying information in accordance with the input image, generating a predictive signal for the input image, and encoding the input image; and an output section outputting, as encoded data, compressed data obtained by the encoding by the encoding section together with modification method information indicating a modification method for the reference image. Thereby, image information can be encoded/decoded more efficiently by generating an appropriate predictive signal.

14 Claims, 22 Drawing Sheets

U.S. PATENT DOCUMENTS

2005/0243920 A1* 11/2005 Murakami et al. ....... 375/240.12

FOREIGN PATENT DOCUMENTS

| | | |
|---|---|---|
| EP | 1 578 135 A3 | 9/2005 |
| JP | 9 200757 | 7/1997 |
| WO | 2005 107267 | 11/2005 |

OTHER PUBLICATIONS

Okubo, Yo. et al., "Inpuresu Hyojun Kyokasho Series H. 264/AVC Kyokasho", Kabushiki Kaisha Inpuresu Netto Bijinesu Kanpani, pp. 123-125, 127, 2004.

Hojin, S., "Sogo Multimedia Sensho MPEG", pp. 94-96, 1996.

Murakami, T. et al., "H. 264/AVC Intra-Prediction ni Okeru Hoko Izonsei o Riyo Shita Kakucho Fugoka Hoshiki", The Institute of Electronics, Information and Comminication Engineers, Engineering Sciences Society Taikai Koen Ronbunshu, A-6-2, p. 115,2004.

Office Action issued Apr. 8, 2011, in China Patent Application No. 200680037923.8 (with English translation).

Extended European Search Report issued Apr. 20, 2011, in Application No. / Patent No. 11154312.0-1522.

Tomokazu Murakami, Hitachi, et al., "Adaptive Picture Flipping Coding; D 92", International Telecommunication Union, vol. Study Group 16, XP 017407884, Jul. 26, 2005, pp. 1-6.

* cited by examiner

DYNAMIC IMAGE ENCODING DEVICE, DYNAMIC IMAGE DECODING DEVICE, DYNAMIC IMAGE ENCODING METHOD, DYNAMIC IMAGE DECODING METHOD, DYNAMIC IMAGE ENCODING PROGRAM, AND DYNAMIC IMAGE DECODING PROGRAM

TECHNICAL FIELD

The present invention relates to a moving image encoding device, a moving image decoding device, a moving image encoding method, a moving image decoding method, a moving image encoding program, and a moving image decoding program.

BACKGROUND ART

One moving image encoding device that exists is a moving image inversion encoding device that performs encoding after symmetrically inverting an input image in a vertical direction, a horizontal direction, or a vertical and horizontal direction frame by frame beforehand as mentioned in Non Patent Document 1. This is because input images generally have non-uniform characteristics within the frames and, therefore, in cases where predictive encoding with directional dependence from the top left to the bottom right is performed in raster scan order, the encoding efficiency can be improved by inverting the image in the direction of higher predictive efficiency.

The encoding device according to Non Patent Document 1 inverts the input image by choosing from four types of options, namely, no inversion, vertical inversion, horizontal inversion, and vertical and horizontal inversion. (a) of FIG. 1 shows the input image; (b) of FIG. 1 shows an image resulting from the non-inversion of the input image; (c) of FIG. 1 shows an image obtained by inverting the input image in a vertical direction; (d) of FIG. 1 shows an image obtained by inverting the input image in a horizontal direction; and (e) of FIG. 1 shows an image obtained by inverting the input image in a vertical and horizontal direction. Furthermore, in inter-predictive encoding which makes predictions between frames, the encoding device inverts the reference image which is a locally decoded image of an image which has been previously encoded in the same direction as the input image and performs encoding by using the inverted reference image to generate a predictive signal for the inverted input image constituting an encoding target. Compressed data obtained by encoding are output together with an identifier which indicates the inversion direction of the input image. In addition, the compressed data obtained by encoding are locally decoded, inverted in the opposite direction from the inversion direction of the input image, translated in the same direction as the input image, and saved as a reference image for the next frame and subsequent frames. (f) of FIG. 1 shows an image obtained by inverting the input image ((b) of FIG. 1) resulting from non-inversion of the input image in the opposite direction. That is, (f) and (b) of FIG. 1 show the same image as (a) of FIG. 1. (g) of FIG. 1 shows an image which is obtained by inverting an image ((c) of FIG. 1) obtained by inverting the input image in a vertical direction in the opposite direction. (h) of FIG. 1 shows an image which is obtained by inverting an image ((d) of FIG. 1) obtained by inverting the input image in a horizontal direction. (i) of FIG. 1 shows an image which is obtained by inverting an image ((e) of FIG. 1) obtained by inverting the input image in a vertical and horizontal direction in the opposite direction.

Furthermore, in inter-predictive decoding which makes predictions between frames, the decoding device which appears in Non Patent Document 1 discriminates the inversion direction by obtaining an identifier that indicates the inversion direction of the input image from code which is transmitted by the encoding device and inverts a reference image which is a previously decoded image in the same direction as the inversion direction of the input image. Further, the decoding device uses the compressed data obtained from the code transmitted by the encoding device and the inverted reference image to decode the inverted image and then inverts the inverted image in the opposite direction from the inversion direction of the input image to translate the image in the same direction as the input image and generate a decoded image, and saves the decoded image as a reference image for the next frame and subsequent frames.

[Non Patent Document 1] Murakami et al, "Expanded encoding system that utilizes directional dependence of a H.264/AVC Baseline Profile", IEICE 2005

DISCLOSURE OF THE INVENTION

Problem to Be Solved by the Invention

The encoding device and decoding device of the prior art invert a reference image in the same direction as the inversion direction of the input image in order to generate a predictive signal. Hence, the prior art is confronted by the following problems. That is, in cases where there is a need for information that is to accompany the reference image for the purpose of generating a predictive signal, the information accompanying the reference image does not correspond with the inverted reference image and a correct predictive signal can therefore not be generated. In addition, the encoding device and decoding device of the prior art change the inversion direction for each frame image but the inversion direction cannot be changed for each of the slices or each of the blocks which are obtained by further dividing the frame images.

The present invention was conceived in order to solve the above problems and an object thereof is to provide, by generating a precise predictive signal, a moving image encoding device which more efficiently encodes image information, a moving image encoding method, a moving image encoding program, a moving image decoding device which more efficiently decodes encoded image information, a moving image decoding method, and a moving image decoding program.

Means for Solving the Problem

The moving image encoding device of the present invention comprises input means for inputting an input image is an encoding target; reference image accumulation means for accumulating a reference image; reference image accompanying information accumulation means for accumulating reference image accompanying information which accompanies the reference image; encoding means for modifying the reference image and the reference image accompanying information in accordance with the input image, generating a predictive signal for the input image, and encoding the input image; and output means for outputting, as encoded data, compressed data obtained by encoding by the encoding means together with modification method information indicating a modification method for the reference image.

A moving image encoding method of the present invention comprises an input step in which input means inputs an input image is an encoding target; a reference image accumulation step in which reference image accumulation means accumulates a reference image; a reference image accompanying information accumulation step in which reference image accompanying information accumulation means accumulates reference image accompanying information which accompanies the reference image; an encoding step in which encoding means modifies the reference image and the reference image accompanying information in accordance with the input image, generates a predictive signal for the input image, and encodes the input image; and an output step in which output means outputs, as encoded data, compressed data obtained by encoding in the encoding step together with modification method information indicating a modification method for the reference image.

A moving image encoding program of the present invention causes a computer to function as input means for inputting an input image is an encoding target; reference image accumulation means for accumulating a reference image; reference image accompanying information accumulation means for accumulating reference image accompanying information which accompanies the reference image; encoding means for modifying the reference image and the reference image accompanying information in accordance with the input image, generating a predictive signal for the input image, and encoding the input image; and output means for outputting, as encoded data, compressed data obtained by encoding by the encoding means together with modification method information indicating a modification method for the reference image.

According to the present invention, because the reference image accumulation means accumulates a reference image and the reference image accompanying information accumulation means accumulates reference image accompanying information, it is possible to accumulate information which corresponds with an input image which constitutes the encoding target. Further, because the encoding means modifies the reference image and reference image accompanying information in accordance with the input image and the encoding means generates a predictive signal, it is possible to modify the input image so as to be encoded easily and to generate a predictive signal which corresponds with the modified input image. Accordingly, the encoding means is able to more precisely generate the predictive signal by using the reference image and the reference image accompanying information and is able to perform input image encoding more efficiently.

A moving image encoding device of the present invention comprises input means for inputting an input image is an encoding target; reference image accumulation means for accumulating a reference image; reference image accompanying information accumulation means for accumulating reference image accompanying information which accompanies the reference image; image modification means for modifying the input image and the reference image; reference image accompanying information modification means for modifying the reference image accompanying information in accordance with the input image and the reference image; encoding means for generating a predictive signal for the input image with using the modified reference image and the modified reference image accompanying information, and encoding the input image; and output means for outputting, as encoded data, compressed data obtained by encoding by the encoding means together with modification method information indicating a modification method for the reference image.

A moving image encoding method of the present invention comprises an input step in which input means inputs an input image is an encoding target; a reference image accumulation step in which reference image accumulation means accumulates a reference image; a reference image accompanying information accumulation step in which reference image accompanying information accumulation means accumulates reference image accompanying information which accompanies the reference image; an image modification step in which image modification means modifies the input image and the reference image; a reference image accompanying information modification step in which reference image accompanying information modification means modifies the reference image accompanying information in accordance with the input image and the reference image; an encoding step in which encoding means generates a predictive signal for the input image with using the modified reference image and the modified reference image accompanying information, and encodes the input image; and an output step in which output means outputs, as encoded data, compressed data obtained by encoding in the encoding step together with modification method information indicating a modification method for the reference image.

According to the present invention, because the reference image accumulation means accumulates a reference image and the reference image accompanying information accumulation means accumulates reference image accompanying information, it is possible to accumulate information which corresponds with an input image which constitutes the encoding target. Further, because the image modification means modifies the input image and reference image, the reference image accompanying information modification means modifies the reference image accompanying information in accordance with the input image and reference image, and the encoding means uses the modified reference image and the modified reference image accompanying information to generate a predictive signal for the input image, it is possible to modify the input image so as to be encoded easily and to generate a predictive signal which corresponds with the modified input image. Accordingly, the encoding means is able to more precisely generate the predictive signal by using the reference image and the reference image accompanying information and is able to perform input image encoding more efficiently.

Furthermore, the moving image encoding device of the present invention preferably further comprises image reverse modification means for reverse-modifying a locally decoded image which has been locally decoded by the encoding means; and reference image accompanying information reverse modification means for reverse-modifying information which accompanies the locally decoded image output by the encoding means, wherein the reference image accumulation means preferably accumulates information which has been reverse-modified by the image reverse modification means as the reference image; and the reference image accompanying information accumulation means preferably accumulates information which has been reverse-modified by the reference image accompanying information reverse modification means as the reference image accompanying information.

Further, the moving image encoding method of the present invention preferably further comprises an image reverse modification step in which image reverse modification means reverse-modifies a locally decoded image that has been locally decoded by the encoding means; and a reference image accompanying information reverse modification step in which reference image accompanying information reverse modification means reverse-modifies information which accompanies the locally decoded image output by the encoding means, wherein information which has been reverse-modified in the image reverse modification step is preferably accumulated as the reference image in the reference image accumulation step; and information which has been reverse-modified in the reference image accompanying information reverse modification step is preferably accumulated as the reference image accompanying information in the reference image accompanying information accumulation step.

The reference image and the reference image accompanying information which correspond with the input image which is input next can be generated.

Furthermore, the reference image accompanying information of the moving image encoding device of the present invention is preferably a motion vector of the reference image.

In addition, the reference image accompanying information of the moving image encoding method of the present invention is also preferably a motion vector of the reference image.

A moving image decoding device of the present invention comprises division means for dividing encoded data which have been input into compressed data and modification method information; reference image accumulation means for accumulating a reference image; reference image accompanying information accumulation means for accumulating reference image accompanying information which accompanies the reference image; and decoding means for modifying the reference image and the reference image accompanying information with using the modification method information, generating a predictive signal for the decoded image, and decoding a decoded image.

A moving image decoding method of the present invention comprises a division step in which division means divides encoded data which have been input into compressed data and modification method information; a reference image accumulation step in which reference image accumulation means accumulates a reference image; a reference image accompanying information accumulation step in which reference image accompanying information accumulation means accumulates reference image accompanying information which accompanies the reference image; and a decoding step in which decoding means modifies the reference image and the reference image accompanying information with using the modification method information, generates a predictive signal for the decoded image, and decodes a decoded image.

A moving image decoding program of the present invention causes a computer to function as division means for dividing encoded data which have been input into compressed data and modification method information; reference image accumulation means for accumulating a reference image; reference image accompanying information accumulation means for accumulating reference image accompanying information which accompanies the reference image; and decoding means for modifying the reference image and the reference image accompanying information with using the modification method information, generating a predictive signal for the decoded image, and decoding a decoded image.

According to the present invention, because the reference image accumulation means accumulates a reference image and the reference image accompanying information accumulation means accumulates reference image accompanying information which accompanies the reference image, it is possible to accumulate information which corresponds with an input image which constitutes the encoding target. Further, because the division means divides the encoded data which have been input into compressed data and modification method information and the decoding means uses the modification method information to modify the reference image and the reference image accompanying information and generate a predictive signal for the decoded image, the reference image and reference image accompanying information can be modified in accordance with the compression data and a predictive signal which corresponds with the compression data can be generated. Accordingly, the decoding means is able to more precisely generate the predictive signal by using the reference image and the reference image accompanying information and is able to perform compression data decoding more efficiently.

The moving image decoding device of the present invention comprises division means for dividing encoded data which have been input into compressed data and modification method information; reference image accumulation means for accumulating a reference image; reference image accompanying information accumulation means for accumulating reference image accompanying information which accompanies the reference image; image modification means for modifying the reference image in accordance with the modification method information; reference image accompanying information modification means for modifying the reference image accompanying information in accordance with the modification method information; and decoding means for decoding a decoded image by using the modified reference image and the modified reference image accompanying information to generate a predictive signal for the decoded image.

The moving image decoding method of the present invention comprises a division step in which division means divides encoded data which have been input into compressed data and modification method information; a reference image accumulation step in which reference image accumulation means accumulates a reference image; a reference image accompanying information accumulation step in which reference image accompanying information accumulation means accumulates reference image accompanying information which accompanies the reference image; an image modification step in which image modification means modifies the reference image in accordance with the modification method information; a reference image accompanying information modification step in which reference image accompanying information modification means modifies the reference image accompanying information in accordance with the modification method information; and a decoding step in which decoding means decodes a decoded image by using the modified reference image and the modified reference image accompanying information to generate a predictive signal for the decoded image.

According to the present invention, because the reference image accumulation means accumulates a reference image and the reference image accompanying information accumulation means accumulates reference image accompanying information which accompanies the reference image, it is possible to accumulate information which corresponds with an input image which constitutes the encoding target. Further, because the division means divides the encoded data which have been input into compressed data and modification method information, the image modification means modifies the reference image in accordance with the modification method information, and the reference image accompanying information modification means modifies the reference image accompanying information in accordance with the modification method information, and the decoding means uses the modified reference image and the modified reference image accompanying information to generate a predictive signal for the decoded image, the reference image and reference image accompanying information can be modified in accordance with the compression data and a predictive signal which corresponds with the compression data can be generated. Accordingly, the decoding means is able to more precisely generate the predictive signal by using the reference image and the reference image accompanying information and is able to perform compression data decoding more efficiently.

The moving image encoding device of the present invention further comprises image reverse modification means for reverse-modifying a decoded image that has been decoded by the decoding means; and reference image accompanying information reverse modification means for reverse-modifying information which accompanies the decoded image which is output by the decoding means, wherein the reference image accumulation means preferably accumulates the information which has been reverse-modified by the image reverse modification means as the reference image; and the reference image accompanying information accumulation means preferably accumulates the information which has been reverse-modified by the reference image accompanying information reverse modification means as the reference image accompanying information.

Further, the moving image decoding method preferably further comprises an image reverse modification step in which image reverse modification means reverse-modifies the decoded image that has been decoded in the decoding step; and a reference image accompanying information reverse modification step in which reference image accompanying information reverse modification means reverse-modifies information which accompanies the decoded image that has been decoded in the decoding step, wherein information which has been reverse-modified in the image reverse modification step is preferably accumulated as the reference image in the reference image accumulation step; and information which has been reverse-modified in the reference image accompanying information reverse modification step is preferably accumulated as the reference image accompanying information in the reference image accompanying information accumulation step.

The reference image and the reference image accompanying information which correspond with the input image which is input next can be generated.

The reference image accompanying information of the moving image decoding device of the present invention is preferably a motion vector of the reference image.

In addition, the reference image accompanying information of the moving image decoding method of the present invention is preferably a motion vector of the reference image.

EFFECT OF THE INVENTION

Encoding and decoding of the image information can be performed more efficiently by generating a precise predictive signal.

REFERENCE NUMERALS

Figure 1:
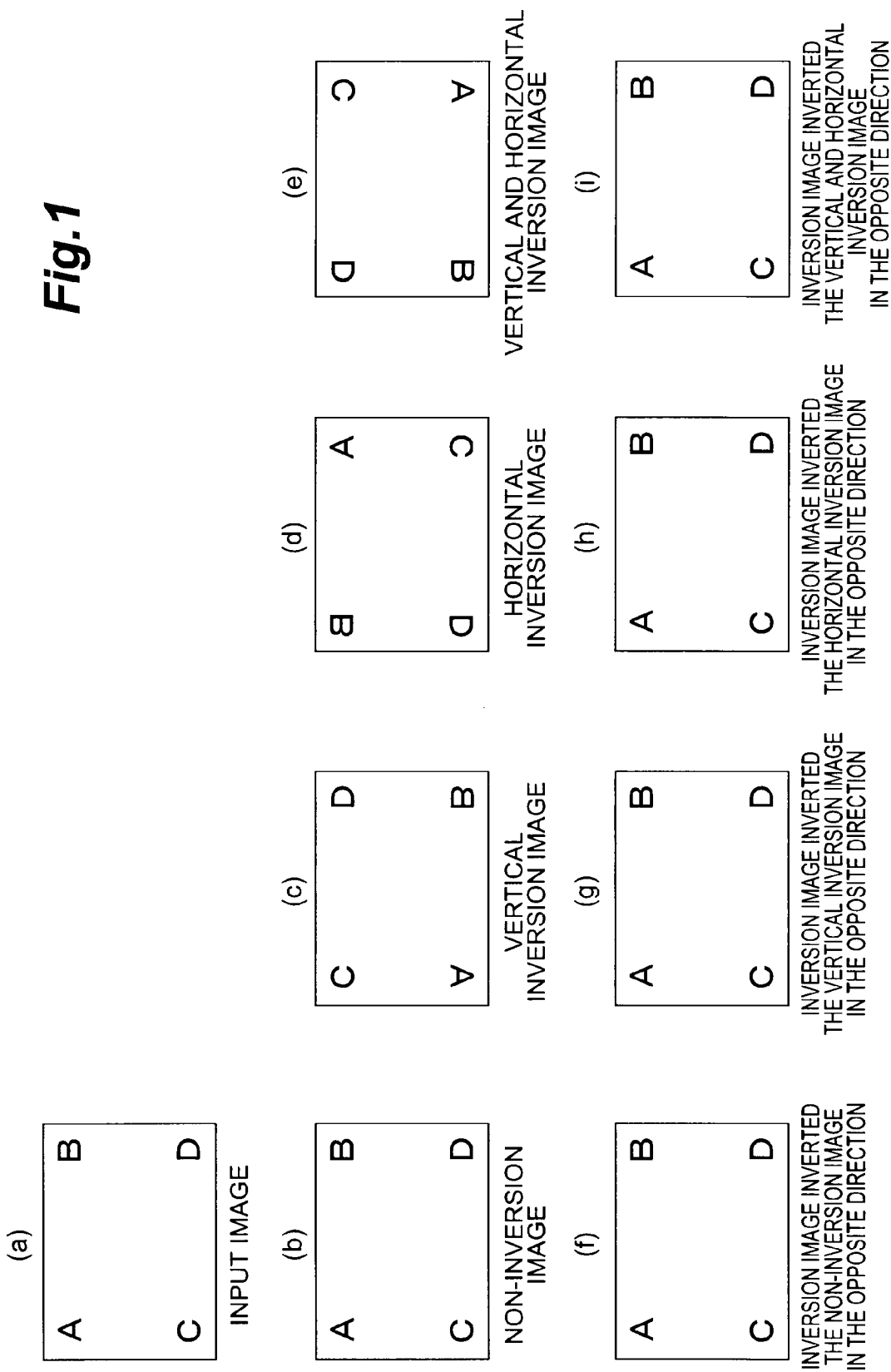
FIG. 1 serves to illustrate a method of processing an input image of a conventional encoding device.

20 . . . MOVING IMAGE ENCODING DEVICE, 70 . . . MOVING IMAGE DECODING DEVICE, 201 . . . INPUT SECTION, 202 . . . REFERENCE IMAGE ACCUMULATION SECTION, 203 . . . REFERENCE IMAGE ACCOMPANYING INFORMATION ACCUMULATION SECTION, 204 . . . IMAGE INVERSION SECTION, 205 . . . REFERENCE IMAGE ACCOMPANYING INFORMATION INVERSION SECTION, 206. ENCODING SECTION, 207 . . . IMAGE REVERSE INVERSION SECTION, 208 . . . REFERENCE IMAGE ACCOMPANYING INFOR-

MATION REVERSE INVERSION SECTION, 209 ... OUTPUT SECTION, 210 ... MOVING IMAGE SIGNAL, 211 ... INPUT IMAGE, 212 ... REFERENCE IMAGE, 213 ... INVERTED INPUT IMAGE, 214 ... INVERTED REFERENCE IMAGE, 215 ... INVERSION DIRECTION INFORMATION, 216 ... REFERENCE IMAGE ACCOMPANYING INFORMATION, 217 ... INVERTED REFERENCE IMAGE ACCOMPANYING INFORMATION, 218 ... COMPRESSED DATA, 219 ... INVERTED LOCALLY DECODED IMAGE, 220 ... INVERTED LOCALLY DECODED IMAGE ACCOMPANYING INFORMATION, 221 ... LOCALLY DECODED IMAGE, 222 ... LOCALLY DECODED IMAGE ACCOMPANYING INFORMATION, 223 ... ENCODED DATA, 701 ... DIVISION SECTION, 702 ... REFERENCE IMAGE ACCUMULATION SECTION, 703 ... REFERENCE IMAGE ACCOMPANYING INFORMATION ACCUMULATION SECTION, 704 ... IMAGE INVERSION SECTION, 705 ... REFERENCE IMAGE ACCOMPANYING INFORMATION INVERSION SECTION, 706 ... DECODING SECTION, 707 ... IMAGE REVERSE INVERSION SECTION, 708 ... REFERENCE IMAGE ACCOMPANYING INFORMATION REVERSE INVERSION SECTION, 709 ... ENCODED DATA, 710 ... COMPRESSED DATA, 711 ... INVERSION DIRECTION INFORMATION, 712 ... REFERENCE IMAGE, 713 ... INVERTED REFERENCE IMAGE, 714 ... REFERENCE IMAGE ACCOMPANYING INFORMATION, 715 ... INVERTED REFERENCE IMAGE ACCOMPANYING INFORMATION, 716 ... INVERTED DECODED IMAGE, 717 ... INVERTED DECODED IMAGE ACCOMPANYING INFORMATION, 718 ... DECODED IMAGE, 719 ... DECODED IMAGE ACCOMPANYING INFORMATION.

BEST MODE FOR CARRYING OUT THE INVENTION

A moving image encoding device and a moving image decoding device according to an embodiment of the present invention will be described with reference to the drawings. The same reference numerals are assigned to the same elements in the drawings and repetitive descriptions are omitted.

First Embodiment

Figure 2:
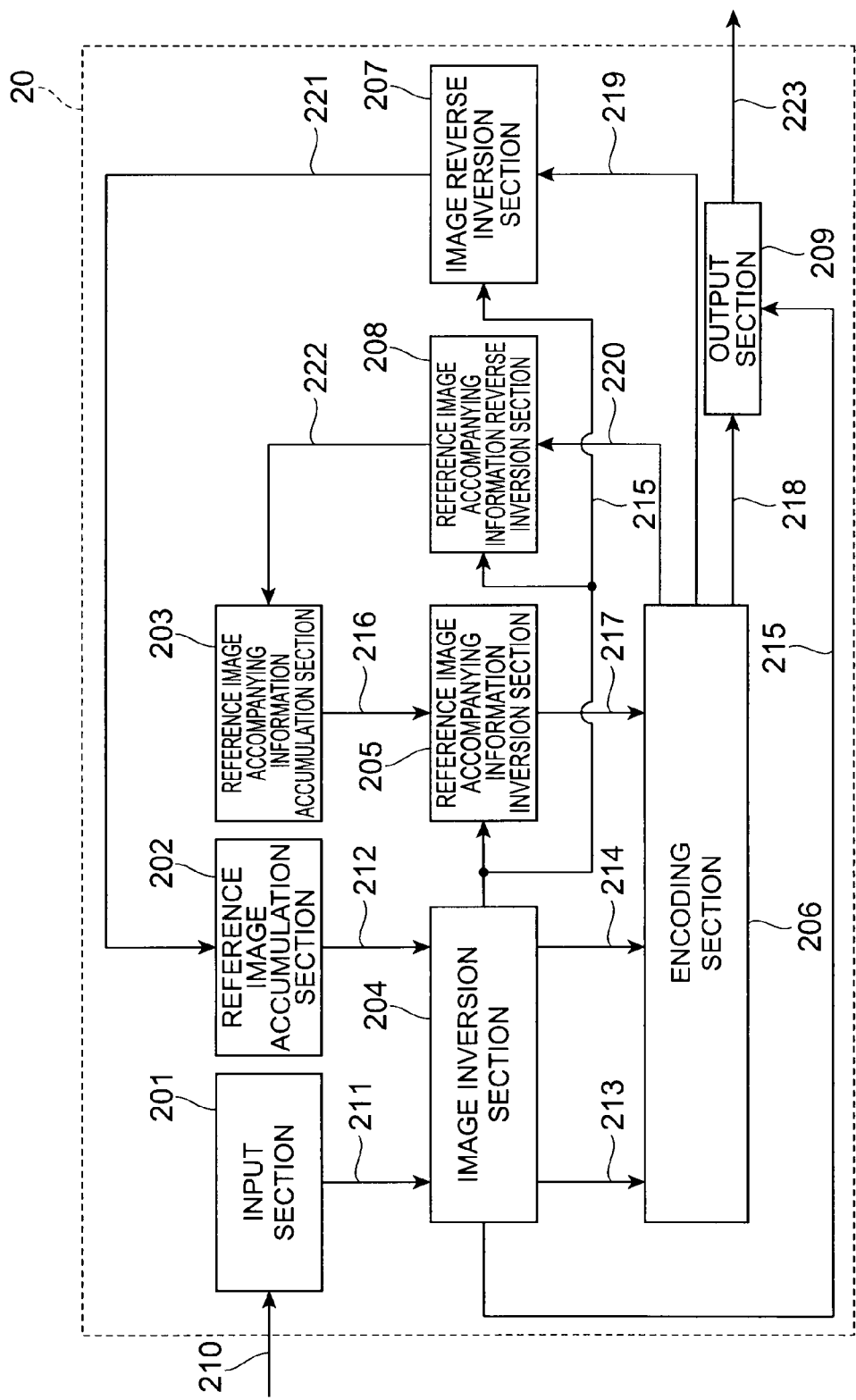
FIG. 2 is a constitutional view of a moving image encoding device according to a first embodiment of the present invention.

The moving image encoding device according to the present invention will now be described by using FIG. 2.

A moving image encoding device 20 according to the present invention is constituted comprising, as functional constituent elements, an input section 201 (input means), a reference image accumulation section 202 (reference image accumulation means), a reference image accompanying information accumulation section 203 (reference image accompanying information accumulation means), an image inversion section 204 (image modification means), a reference image accompanying information inversion section 205 (reference image accompanying information modification means), an encoding section 206 (encoding means), an image reverse inversion section 207 (image reverse modification means), a reference image accompanying information reverse inversion section 208 (reference image accompanying information reverse modification means), and an output section 209 (output means).

The input section 201 divides an input moving image signal 210 into frame images and sends the frame images to the image inversion section 204 as an input image 211.

The reference image accumulation section 202 is a part that accumulates a reference image which is a locally decoded image of an image that has been previously encoded. The reference image accumulation section 202 sends the reference image 212 to the image inversion section 204.

The image inversion section 204 performs inversion on the input image 211 sent by the input section 201 by choosing from four types of options, namely, no inversion, vertical inversion, horizontal inversion, and vertical and horizontal inversion to create an inverted input image 213 which the image inversion section 204 then sends to the encoding section 206. Furthermore, the image inversion section 204 inverts the reference image 212 sent by the reference image accumulation section 202 in the same direction as the direction of inversion of the input image 211 to create the inverted reference image 214 which the image inversion section 204 then sends to the encoding section 206. Furthermore, the image inversion section 204 sends inversion direction information 215 which indicates the inversion direction of the input image 211 to the reference image accompanying information inversion section 205, the image reverse inversion section 207, the reference image accompanying information reverse inversion section 208, and the output section 209.

The reference image accompanying information accumulation section 203 is a part which accumulates reference image accompanying information which is information that accompanies the reference image which is a locally decoded image of a previously encoded image. The reference image accompanying information accumulation section 203 sends the reference image accompanying information 216 to the reference image accompanying information inversion section 205.

The reference image accompanying information inversion section 205 uses the inversion direction information 215 sent by the image inversion section 204 to invert the reference image accompanying information 216 sent by the reference image accompanying information accumulation section 203 in the same direction as the inversion direction of the input image and create the inverted reference image accompanying information 217 before sending to the encoding section 206.

The encoding section 206 uses the inverted reference image 214 sent by the image inversion section 204 and the inverted reference image accompanying information 217 sent by the reference image accompanying information inversion section 205 to create a predictive signal of the inverted input image 213 sent by the image inversion section 204 and performs encoding on the inverted input image. The encoding section 206 sends compressed data 218 obtained by encoding the inverted input image to the output section 209. Furthermore, the encoding section 206 sends an inverted locally decoded image 219 which has been inverted and locally decoded to the image reverse inversion section 207. Furthermore, the encoding section 206 sends inverted locally decoded image accompanying information 220 to the reference image accompanying information reverse inversion section 208.

The image reverse inversion section 207 uses the inversion direction information 215 sent by the image inversion section 204 to invert the inverted locally decoded image 219 sent by the encoding section 206 in the opposite direction from the inversion direction of the input image and generate the locally decoded image 221 before sending the locally decoded image 221 to the reference image accumulation section 202 for use as a reference image in the next frame and subsequent frames.

The reference image accompanying information reverse inversion section 208 uses the inversion direction information 215 sent by the image inversion section 204 to invert the inverted locally decoded image accompanying information 220 sent by the encoding section 206 in the opposite direction from the inversion direction of the input image and generate locally decoded image accompanying information 222 before sending to the reference image accompanying information accumulation section 203 for use as reference image accompanying information in the next frame and subsequent frames.

The output section 209 combines the inversion direction information 215 sent by the image inversion section 204 and the compressed data 218 sent by the encoding section 206 and transmits the result to the outside as encoded data 223. The inversion direction information 215 is two-bit information for each frame such as '00' in the case of no inversion, '01' in the case of vertical inversion, '10' in the case of horizontal inversion, and '11' in the case of vertical and horizontal inversion. Furthermore, various methods for indicating the inversion direction other than the inversion direction information 215 can be employed.

As an example of the reference image accompanying information 216, a motion vector that is employed when generating a reference image may be cited. In this case, the reference image accompanying information accumulation section 203 accumulates motion vectors that are employed when generating a reference image. Furthermore, the reference image accompanying information inversion section 205 uses the inversion direction information 215 sent by the image inversion section 204 to invert the motion vector sent by the reference image accompanying information accumulation section 203 in the same direction as the inversion direction of the input image and generate the inverted reference image accompanying information 217.

More specifically, in cases where the motion vector sent by the reference image accompanying information accumulation section 203 is (MV1$x$, MV1$y$), the reference image accompanying information inversion section 205 generates the inverted motion vector which is the inverted reference image accompanying information as (MV1$x$, MV1$y$) when the inversion direction information 215 indicates non-inversion, generates the inverted motion vector which is inverted reference image accompanying information as (MV1$x$, −MV1$y$) when the inversion direction information 215 indicates vertical inversion, generates the inverted motion vector which is inverted reference image accompanying information as (−MV1$x$, MV1$y$) when the inversion direction information 215 indicates horizontal inversion, and generates the inverted motion vector which is inverted reference image accompanying information as (−MV1$x$, −MV1$y$) when the inversion direction information 215 indicates vertical and horizontal inversion. The position of the motion vector within the frame is also inverted according to the inversion direction in the same way as the positions of the pixels in the input image and reference image.

Figure 5:
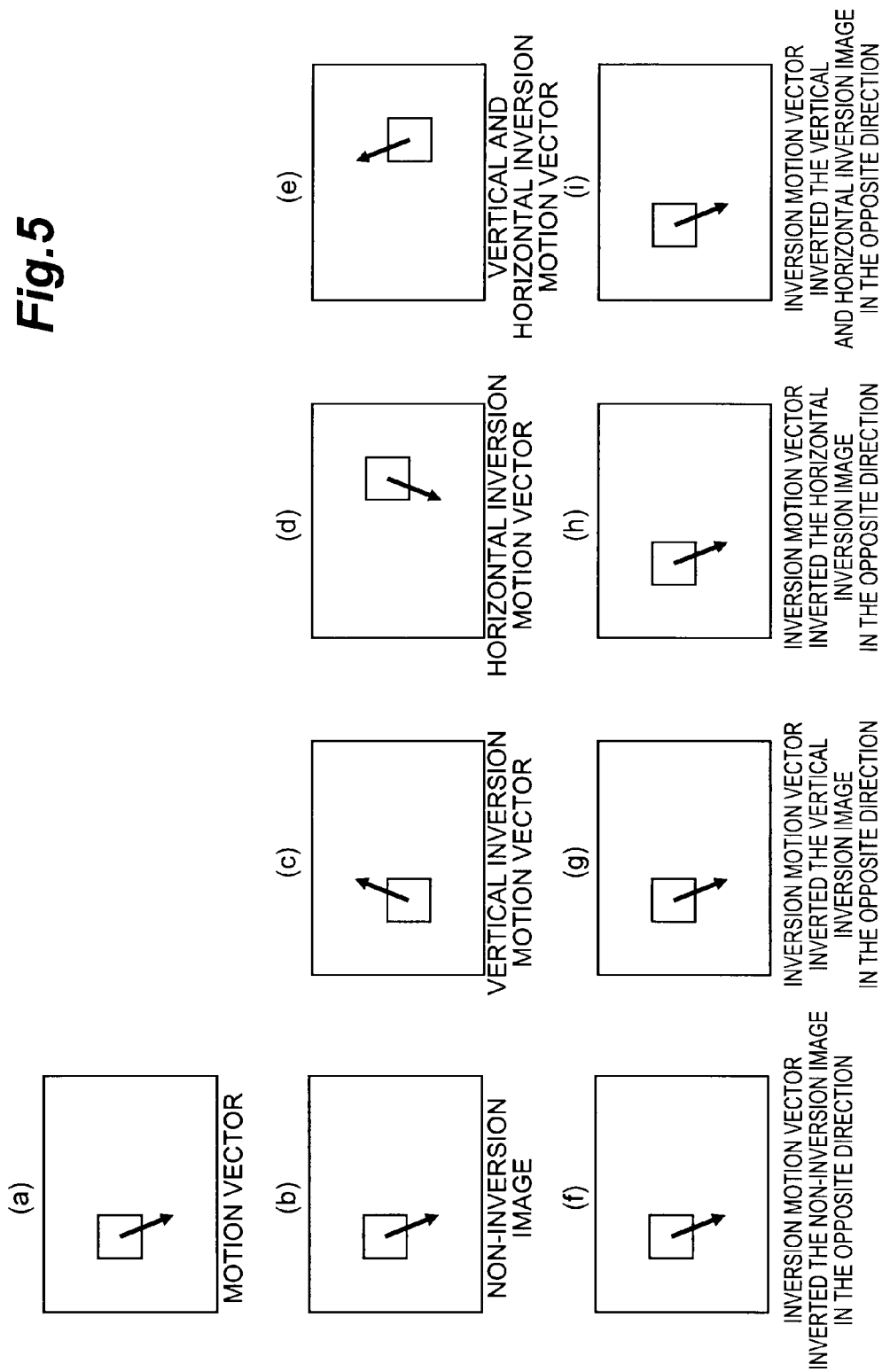
FIG. 5 serves to illustrate a method of processing reference image accompanying information according to the first embodiment of the present invention.

(a) FIG. 5 shows a motion vector that is used when generating the reference image. (b) of FIG. 5 shows an inverted motion vector in the case of non-inversion. That is, (b) of FIG. 5 shows a motion vector of the same orientation as that of (a) of FIG. 5. (c) of FIG. 5 shows an inverted motion vector in the case of vertical inversion. (d) of FIG. 5 shows an inverted motion vector in the case of horizontal inversion. (e) of FIG. 5 shows an inverted motion vector in the case of vertical and horizontal inversion. In addition, the reference image accompanying information reverse inversion section 208 uses inversion direction information 215 sent by the image inversion section 204 to invert the inverted motion vector sent by the encoding section 206 in the opposite direction from the inversion direction of the input image and generate locally decoded image accompanying information 222. More specifically, in cases where the inverted motion vector sent by the encoding section 206 is (MV2$x$, MV2$y$), the reference image accompanying information reverse inversion section 208 generates the motion vector which is the locally decoded image accompanying information as (MV2$x$, MV2$y$) when the inversion direction information 215 indicates non-inversion, generates the motion vector which is the locally decoded image accompanying information as (MV2$x$, −MV2$y$) when the inversion direction information 215 indicates vertical inversion, generates the motion vector which is the locally decoded image accompanying information as (−MV2$x$, MV2$y$) when the inversion direction information 215 indicates horizontal inversion, and generates the motion vector which is the locally decoded image accompanying information as (−MV2$x$, −MV2$y$) when the inversion direction information 215 indicates vertical and horizontal inversion.

Furthermore, the position within the frame of the inverted motion vector is also inverted in the opposite direction according to the inversion direction in the same way as the positions of the pixels in the inverted locally decoded image. (f) of FIG. 5 shows a motion vector obtained by inverting the inverted motion vector in the case of non-inversion ((b) of FIG. 5) in the opposite direction. That is, (f) of FIG. 5 is a motion vector of the same orientation as (a) and (b) of FIG. 5. (g) of FIG. 5 shows a motion vector obtained by inverting the inverted motion vector obtained through vertical inversion ((c) of FIG. 5) in the opposite direction. (h) of FIG. 5 shows a motion vector obtained by inverting the inverted motion vector obtained through horizontal inversion ((d) of FIG. 5) in the opposite direction. (i) of FIG. 5 shows a motion vector obtained by inverting the inverted motion vector obtained through vertical and horizontal inversion ((e) of FIG. 5) in the opposite direction. However, the reference image accompanying information is not limited to the above motion vectors. Various accompanying information which is used when generating a reference image can be employed.

Furthermore, an example of an encoding system that is used by the encoding section 206 which can be cited is the H.264/AVC encoding system (See joint Video Team (JVT) of ISO/IEC MPEG and ITU-VCEG, "Editor's Proposed Draft Text Modifications for Joint Video Specification (ITU-T Rec.H.264|ISO/IEC 14496-10 AVC", Geneva modifications draft 37). However, the encoding system employed is not limited to the H.264/AVC encoding system. Encoding methods of a variety of systems that perform encoding by generating a predictive signal of an input image from a reference image and the information accompanying the reference image can be applied.

The encoding section 206 will now be described in more detail by using FIG. 3.

The encoding section 206 is constituted comprising, as functional constituent elements, a block division section 301, a predictive signal generation section 302, a subtractor 303, a transformation section 304, a quantization section 305, an entropy encoding section 306, an inverse quantization section 307, an inverse transformation section 308, an adder 309.

The block division section 301 generates inverted input image blocks 310 by dividing the inverted input image 213 into blocks which are the units to undergo encoding processing and sends the inverted input image blocks 310 to the subtractor 303.

The predictive signal generation section 302 generates a predictive signal 311 for the encoding target blocks by using the inverted reference image 214 and the inverted reference image accompanying information 217 and sends the predictive signal 311 to the subtractor 303 and adder 309. Furthermore, the predictive signal generation section 302 sends encoding information 312 which is employed in the generation of the predictive signal to the entropy encoding section 306. In addition, the predictive signal generation section 302 outputs the inverted locally decoded image accompanying information 220 determined by the generation of the predictive signal.

The subtractor 303 generates a residual signal 313 by subtracting the predictive signal 311 sent by the predictive signal generation section 302 from the inverted input image blocks 310 sent by the block division section 301 and sends the residual signal 313 to the transformation section 304.

The transformation section 304 generates an orthogonal transformation coefficient 314 by subjecting the residual signal 313 sent by the subtractor 303 to orthogonal transformation and sends the orthogonal transformation coefficient 314 to the quantization section 305.

The quantization section 305 generates a quantization orthogonal transformation coefficient 315 by quantizing the orthogonal transformation coefficient 314 sent by the transformation section 304 and sends the quantization orthogonal transformation coefficient 315 to the entropy encoding section 306 and inverse quantization section 307.

The entropy encoding section 306 performs entropy encoding by combining the encoding information 312 sent by the predictive signal generation section 302 and the quantization orthogonal transformation coefficient 315 sent by the quantization section 305 and generates and outputs compressed data 218.

The inverse quantization section 307 generates a local decoding orthogonal transformation coefficient 316 by performing inverse quantization on the quantization orthogonal transformation coefficient 315 sent by the quantization section 305 and sends the local decoding orthogonal transformation coefficient 316 to the inverse transformation section 308.

The inverse transformation section 308 generates a local decoding residual signal 317 by performing inverse orthogonal transformation on the local decoding orthogonal transformation coefficient 316 sent by the inverse quantization section 307 and sends the local decoding residual signal 317 to the adder 309.

The adder 309 adds the predictive signal 311 sent by the predictive signal generation section 302 and the local decoding residual signal 317 sent by the inverse transformation section 308 to generate and output the inverted locally decoded image 219.

An inverted motion vector is cited as an example of the inverted reference image accompanying information 217. In this case, the predictive signal generation section 302 uses the inverted reference image 214 and the inverted motion vector which is the inverted reference image accompanying information 217 to generate a predictive signal for an encoded block in the same way as the B-picture temporal direct mode predictive system of an H.264/AVC encoding system. The predictive signal generation section 302 may also use a variety of systems other than that of generating a predictive signal for an input image from a reference image and a motion vector which accompanies the reference image.

Figure 4:
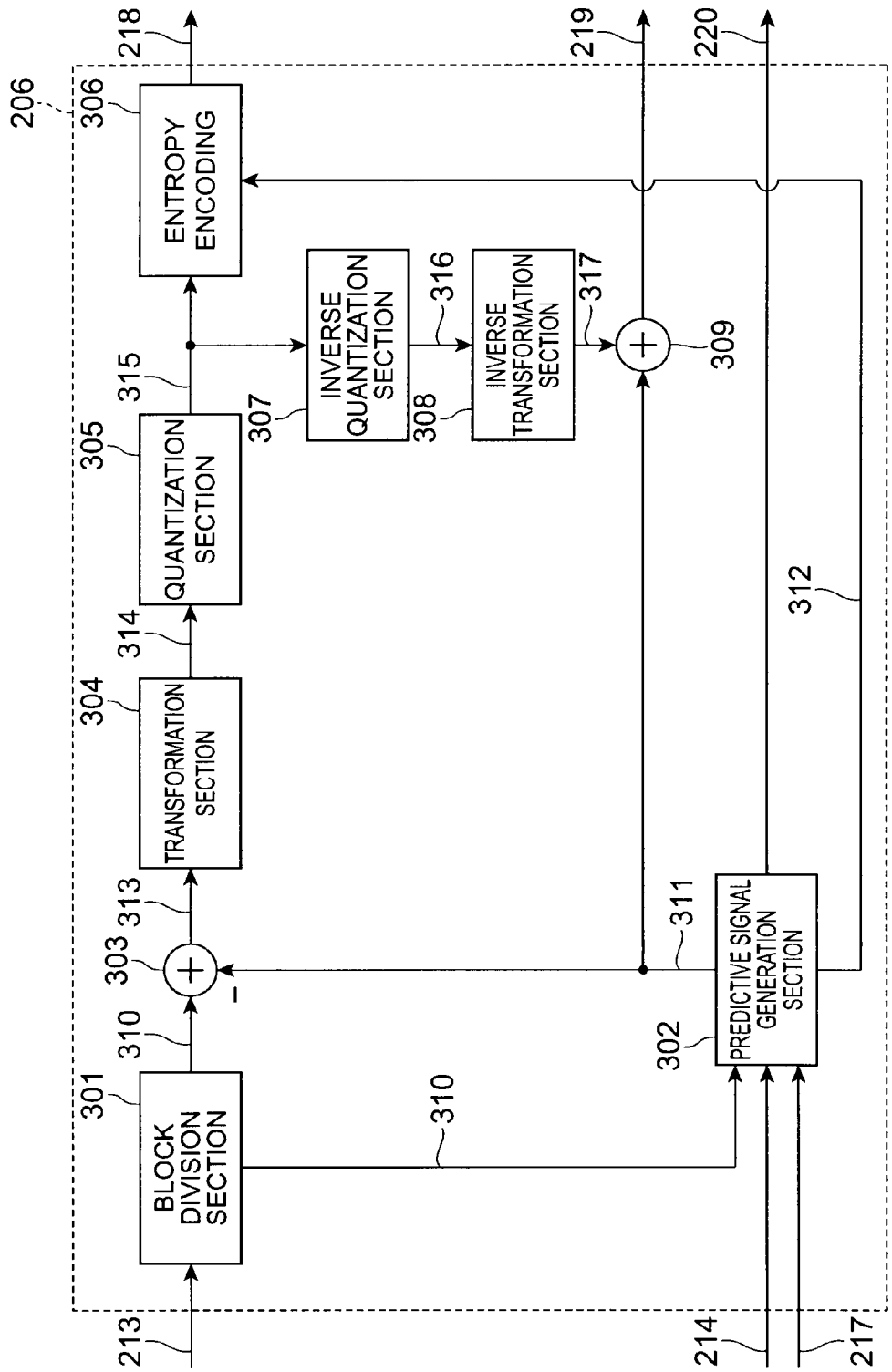
FIG. 4 is a modified example of an encoding section that is provided in the moving image encoding device according to the first embodiment of the present invention.

Furthermore, the encoding section 206 may also be a device such as that shown in FIG. 4.

Figure 3:
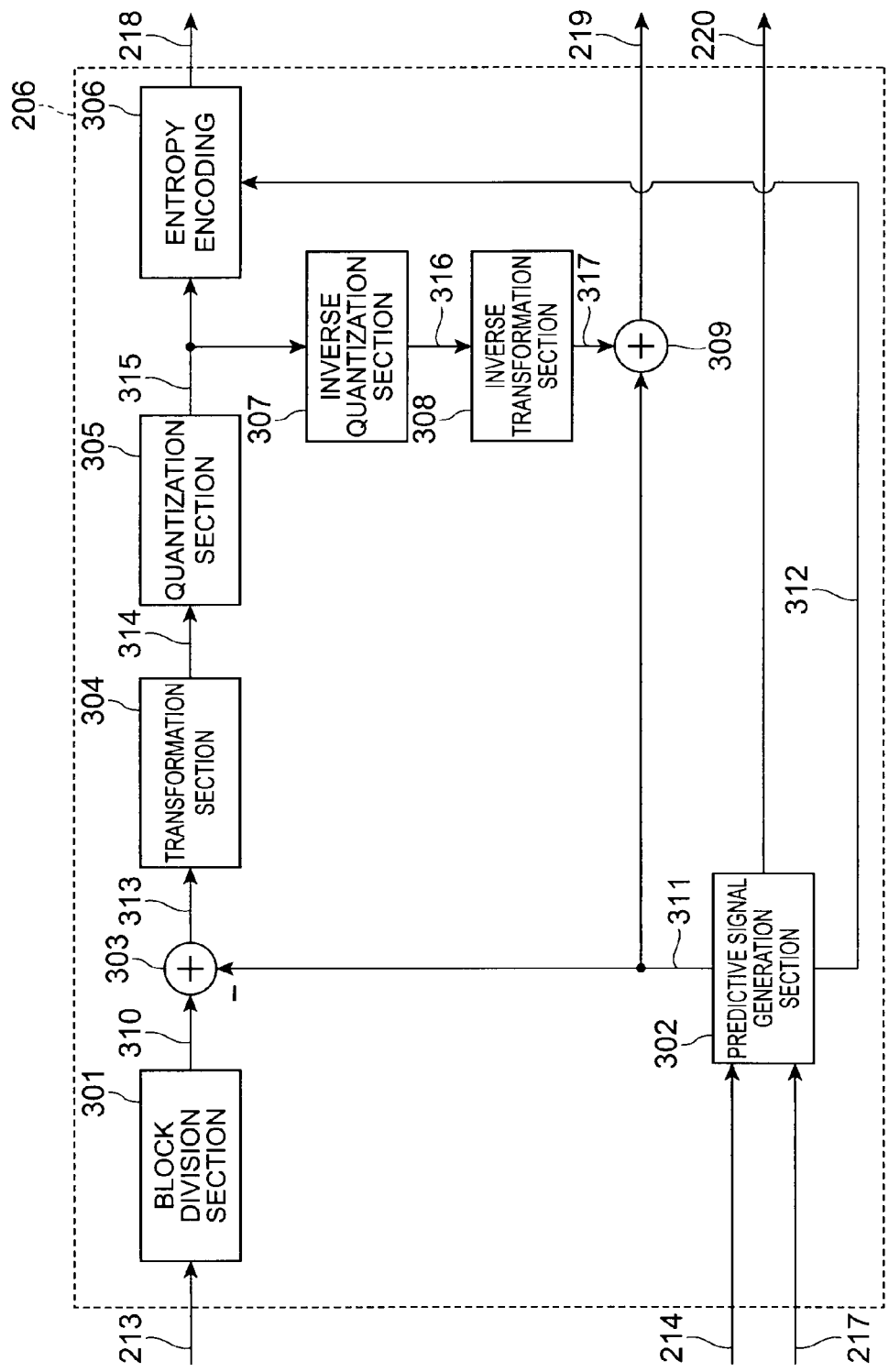
FIG. 3 is a constitutional view of an encoding section that is provided in the moving image encoding device according to the first embodiment of the present invention.

The difference between FIGS. 3 and 4 resides only in the fact that, whereas the predictive signal generation section 302 in FIG. 3 uses the inverted reference image 214 and the inverted reference image accompanying information 217 to generate a predictive signal, the predictive signal generation section 302 in FIG. 4 uses the inverted reference image 214, the inverted reference image accompanying information 217 and the inverted input image blocks 310 sent by the block division section 301 to generate a predictive signal. Otherwise, FIGS. 3 and 4 are the same.

Figure 6:
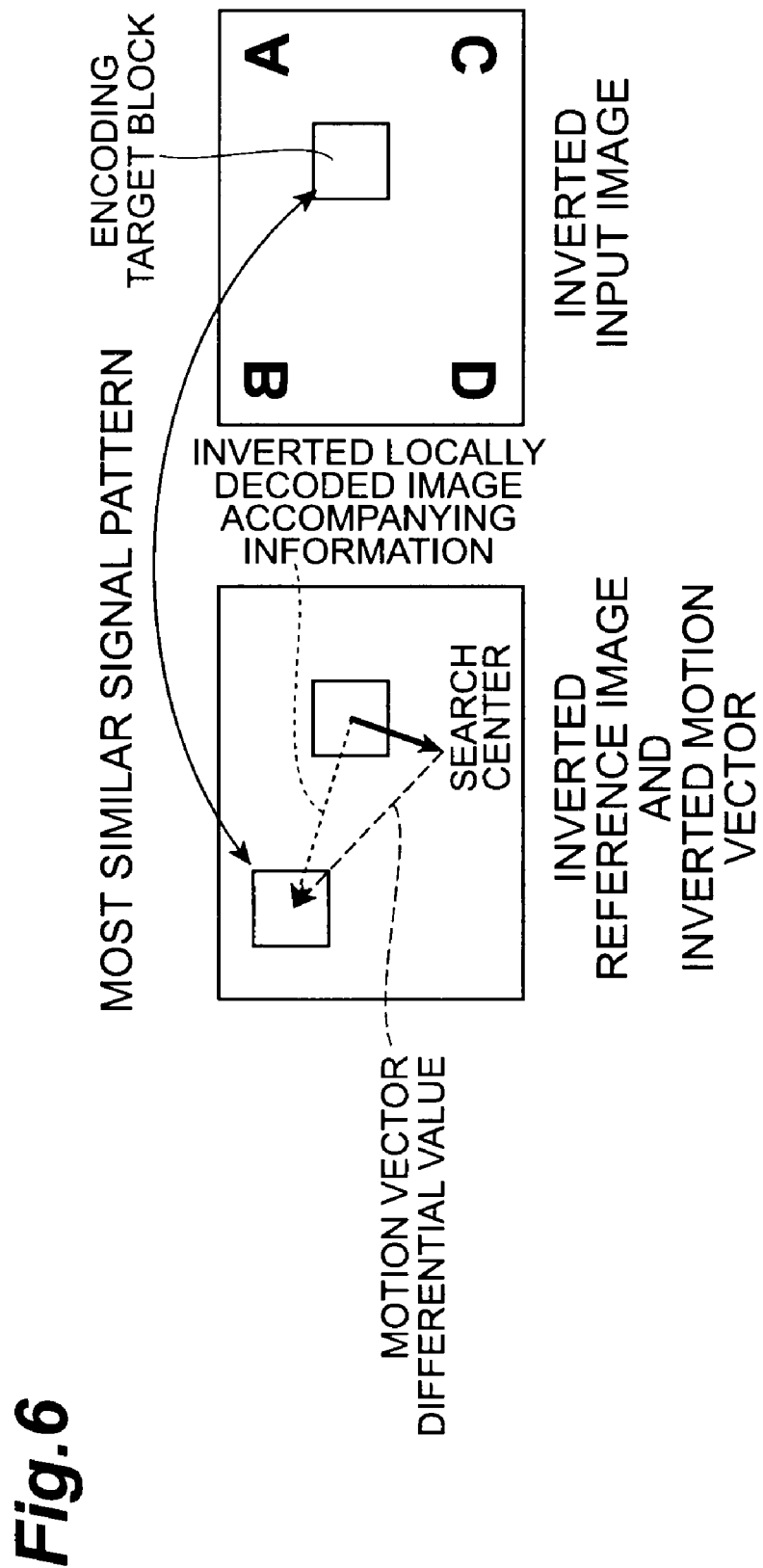
FIG. 6 serves to illustrate inverted locally decoded image accompanying information according to the first embodiment of the present invention.

In the predictive signal generation section 302 shown in FIG. 4, the method of using an inverted motion vector which is the inverted reference image accompanying information 217 to generate a predictive signal for the encoding target block from the inverted input image block 310 and the inverted reference image 214 is as follows. That is, as per FIG. 6, the predictive signal generation section 302 references the inverted motion vector in the same position as the encoding target block, searches on the inverted reference image for the block with the signal pattern which is the most similar to that of the inverted input image block by taking the point of the inverted motion vector as the center of the search and thus produces a predictive signal for the encoding target block from the block signal pattern.

In addition, the predictive signal generation section 302 outputs the vector for the displacement from the position of the encoding target block to the block with the signal pattern which is the most similar to the inverted input image block as the inverted locally decoded image accompanying information 220. In addition, from the center of the search which is the point of the inverted motion vector, the vector for the displacement to the block with the signal pattern which is the most similar to the inverted input image block is included in the encoding information 312 as the motion vector differential value and encoded. The predictive signal generation section 302 may also use a variety of systems other than that of using the reference image, the motion vector which accompanies the reference image, and the input image to generate a predictive signal for the input image.

Figure 7:
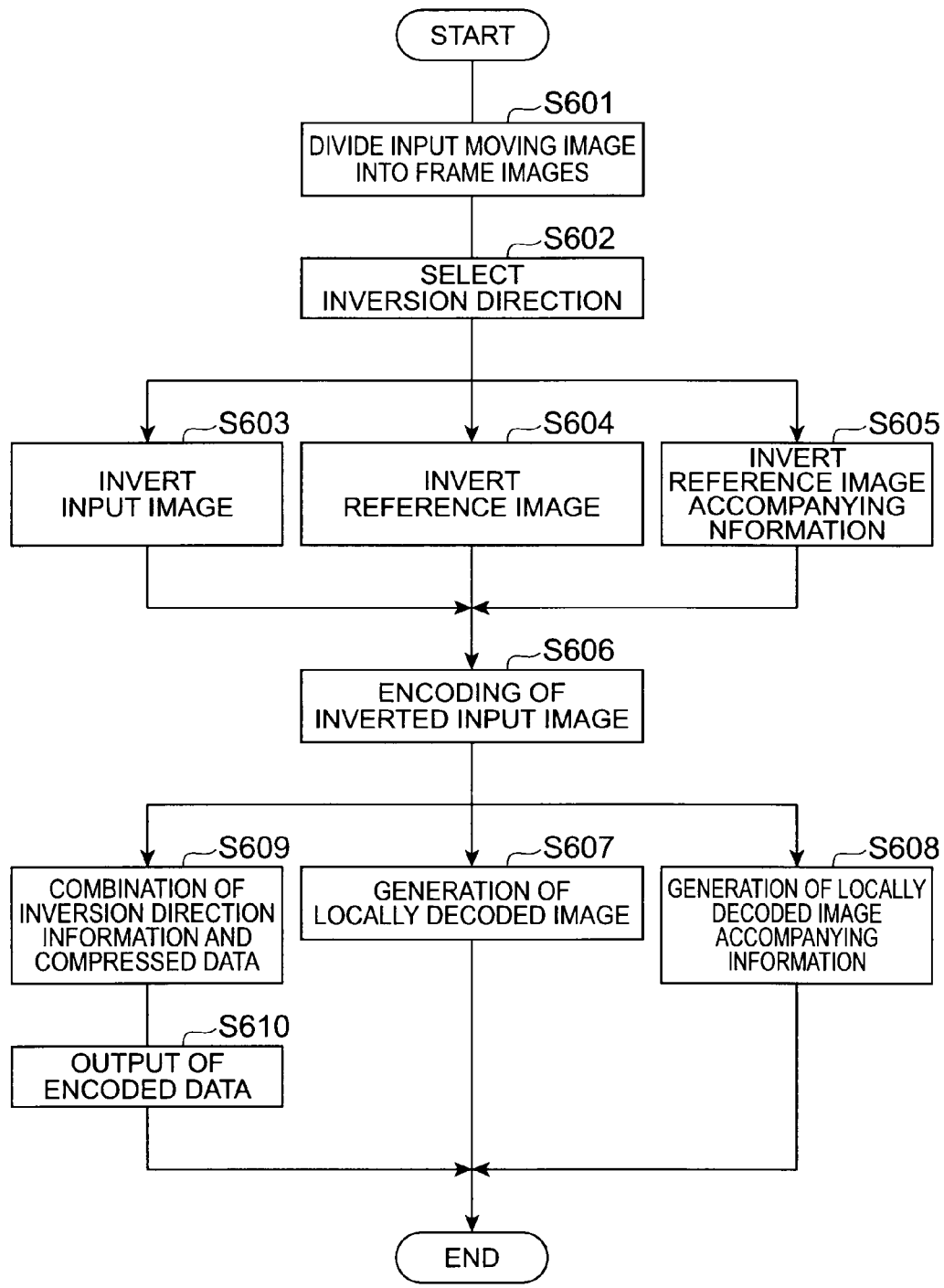
FIG. 7 is a flowchart showing the moving image encoding method according to the first embodiment of the present invention.

The operation of the moving image encoding device 20 according to the present invention will be described next by using FIG. 7. The operation of the moving image encoding device 20 according to the present invention can be executed by a program.

First, the moving image signal 210 which is input by the input section 201 is divided into frame images (step S601). Thereafter, the image inversion section 204 inverts the input image 211 sent by the input section 201 by choosing from four types of options, namely, no inversion, vertical inversion, horizontal inversion, and vertical and horizontal inversion (step S602) and creates the inverted input image 213 (step S603). Furthermore, the image inversion section 204 inverts the reference image 212 sent by the reference image accumulation section 202 in the same direction as the inversion direction of the input image 211 to create the inverted reference image 214 (step S604). In addition, the reference image accompanying information inversion section 205 uses the inversion direction information 215 sent by the image inversion section 204 to invert the reference image accompanying information 216 in the same direction as the inversion direction of the input image and create the inverted reference image accompanying information 217 (step S605).

Thereafter, the encoding section 206 uses the inversion reference image 214 sent by the image inversion section 204 and the inverted reference image accompanying information 217 sent by the reference image accompanying information inversion section 205 to create a predictive signal for the inverted input image 213 sent by the image inversion section 204 and encodes the inverted input image (step S606).

The image reverse inversion section 207 subsequently uses the inversion direction information 215 sent by the image inversion section 204 to invert the inverted locally decoded image 219 sent by the encoding section 206 in the opposite direction from the inversion direction of the input image and generate the locally decoded image 221 (step S607). In addition, the reference image accompanying information reverse inversion section 208 uses the inversion direction information 215 sent by the image inversion section 204 to invert the inverted locally decoded image accompanying information sent by the encoding section 206 in the opposite direction from the inversion direction of the input image and generate the locally decoded image accompanying information 222 (step S608).

Furthermore, the output section 209 combines the inversion direction information 215 sent by the image inversion section 204 and the compressed data 218 sent by the encoding section 206 (step S609) and transmits the result to the outside as the encoded data 223 (step S610).

Figure 8:
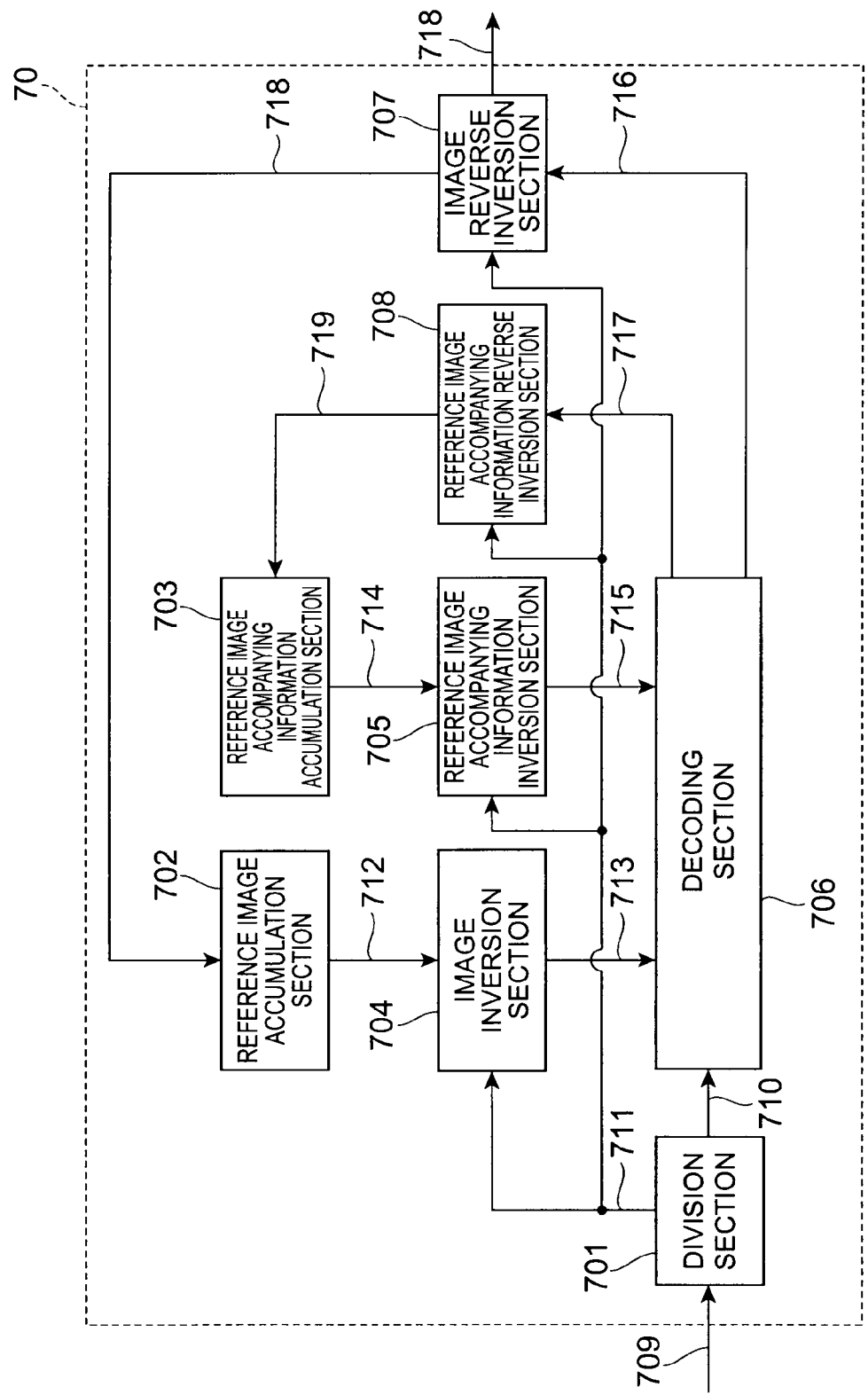
FIG. 8 is a constitutional view of the moving image decoding device according to the first embodiment of the present invention.

The moving image decoding device according to the present invention will be described next by using FIG. 8.

A moving image decoding device 70 according to the present invention is constituted comprising, as functional constituent elements, a division section 701 (division means), a reference image accumulation section 702 (reference image accumulation means), a reference image accompanying information accumulation section 703 (reference image accompanying information accumulation means), an image inversion section 704 (image modification means), a reference image accompanying information inversion section 705 (reference image accompanying information modification means), a decoding section 706 (decoding means), an image reverse inversion section 707 (image reverse modification means), and a reference image accompanying information reverse inversion section 708 (reference image accompanying information reverse modification means).

The division section 701 divides the encoded data 709 that are input after being transmitted from the outside into compressed data 710 and inversion direction information 711. The division section 701 sends the compressed data 710 to the decoding section 706. In addition, the division section 701 sends the inversion direction information 711 to the image inversion section 704, the reference image accompanying information inversion section 705, the image reverse inversion section 707, and the reference image accompanying information reverse inversion section 708. The inversion direction information 711 is two-bit information for each frame such as '00' in the case of no inversion, '01' in the case of vertical inversion, '10' in the case of horizontal inversion, and '11' in the case of vertical and horizontal inversion. Furthermore, various methods for indicating the inversion direction other than the inversion direction information 711 can be employed.

The reference image accumulation section 702 is a part which accumulates the reference image which is a previously decoded image. The reference image accumulation section 702 sends the reference image 712 to the image inversion section 704.

The image inversion section 704 uses the inversion direction information 711 sent by the division section 701 to invert the reference image 712 sent by the reference image accumulation section 702 and generate the inverted reference image 713 which the image inversion section 704 then sends to the decoding section 706.

The reference image accompanying information accumulation section 703 is a part which accumulates reference image accompanying information which is information that accompanies the reference image which is a previously decoded image. The reference image accompanying information accumulation section 703 sends the reference image accompanying information 714 to the reference image accompanying information inversion section 705.

The reference image accompanying information inversion section 705 uses the inversion direction information 711 sent by the division section 701 to invert the reference image accompanying information 714 sent by the reference image accompanying information accumulation section 703 and create the inverted reference image accompanying information 715 before sending to the decoding section 706.

The decoding section 706 uses the compressed data 710 sent by the division section 701, the inverted reference image 713 sent by the image inversion section 704 and the inverted reference image accompanying information 715 sent by the reference image accompanying information inversion section 705 to create a predictive signal for the decoded image and performs decoding on the decoded image which is an inverted decoding target. The decoding section 706 sends an inverted decoded image 716 which has been inverted and decoded to the image reverse inversion section 707. Furthermore, the decoding section 706 sends inverted decoded image accompanying information 717 to the reference image accompanying information reverse inversion section 708.

The image reverse inversion section 707 uses the inversion direction information 711 sent by the division section 701 to invert the inverted decoded image 716 sent by the decoding section 706 in the opposite direction from the inversion direction of the inversion direction information 711 and generate the decoded image 718 before sending the decoded image 718 to the reference image accumulation section 702 for use as a reference image in the next frame and subsequent frames. Furthermore, the image reverse inversion section 707 outputs the decoded image 718 to an external device (not shown) such as a moving image display device.

The reference image accompanying information reverse inversion section 708 uses the inversion direction information 711 sent by the division section 701 to invert the inverted decoded image accompanying information 717 sent by the decoding section 706 in the opposite direction from the inversion direction of the inversion direction information and generate decoded image accompanying information 719 before sending to the reference image accompanying information accumulation section 703 for use as reference image accompanying information in the next frame and subsequent frames.

As an example of the reference image accompanying information, a motion vector that is employed when generating a reference image may be cited. In this case, the reference image accompanying information accumulation section 703 accumulates motion vectors that are employed when generating a reference image. Furthermore, the reference image accompanying information inversion section 705 uses the inversion direction information 711 sent by the division section 701 to invert the motion vector sent by the reference image accompanying information accumulation section 703 in the same direction as the inversion direction of the inversion direction information and generate the inverted reference image accompanying information 715.

More specifically, in cases where the motion vector sent by the reference image accompanying information accumulation section 703 is (MV3$x$, MV3$y$), the reference image accompanying information inversion section 705 generates the inverted motion vector which is the inverted reference image accompanying information as (MV3$x$, MV3$y$) when the inversion direction information 711 indicates non-inversion, generates the inverted motion vector which is inverted reference image accompanying information as (MV3$x$, −MV3$y$) when the inversion direction information 711 indicates vertical inversion, generates the inverted motion vector which is inverted reference image accompanying information as (−MV3x, MV3y) when the inversion direction information 711 indicates horizontal inversion, and generates the inverted motion vector which is inverted reference image accompanying information as (−MV3x, −MV3y) when the inversion direction information 711 indicates vertical and horizontal inversion. The position of the motion vector within the frame is also inverted according to the inversion direction.

In addition, the reference image accompanying information reverse inversion section 708 uses inversion direction information 711 sent by the division section 701 to invert the inverted motion vector sent by the decoding section 706 in the opposite direction from the inversion direction of the inversion direction information and generate decoded image accompanying information 719. More specifically, in cases where the inverted motion vector sent by the decoding section 706 is (MV4x, MV4y), the reference image accompanying information reverse inversion section 708 generates the motion vector which is the decoded image accompanying information as (MV4x, MV4y) when the inversion direction information 711 indicates non-inversion, generates the motion vector which is the decoded image accompanying information as (MV4x, −MV4y) when the inversion direction information 711 indicates vertical inversion, generates the motion vector which is the decoded image accompanying information as (−MV4x, MV4y) when the inversion direction information 711 indicates horizontal inversion, and generates the motion vector which is the locally decoded image accompanying information as (−MV4x, −MV4y) when the inversion direction information 711 indicates vertical and horizontal inversion. In addition, the position of the motion vector within the frame is also inverted in the opposite direction in accordance with the inversion direction. However, the reference image accompanying information is not limited to the motion vector mentioned above and it is possible to employ a variety of accompanying information that is used when generating the reference image.

In addition, an example of a decoding system that is used by the decoding section 706 that can be cited is the H.264/AVC decoding system. However, the decoding system employed is not limited to the H.264/AVC decoding system. Decoding methods of a variety of systems that perform decoding by generating a predictive signal of a decoded image from a reference image and the information accompanying the reference image can be applied.

Figure 9:
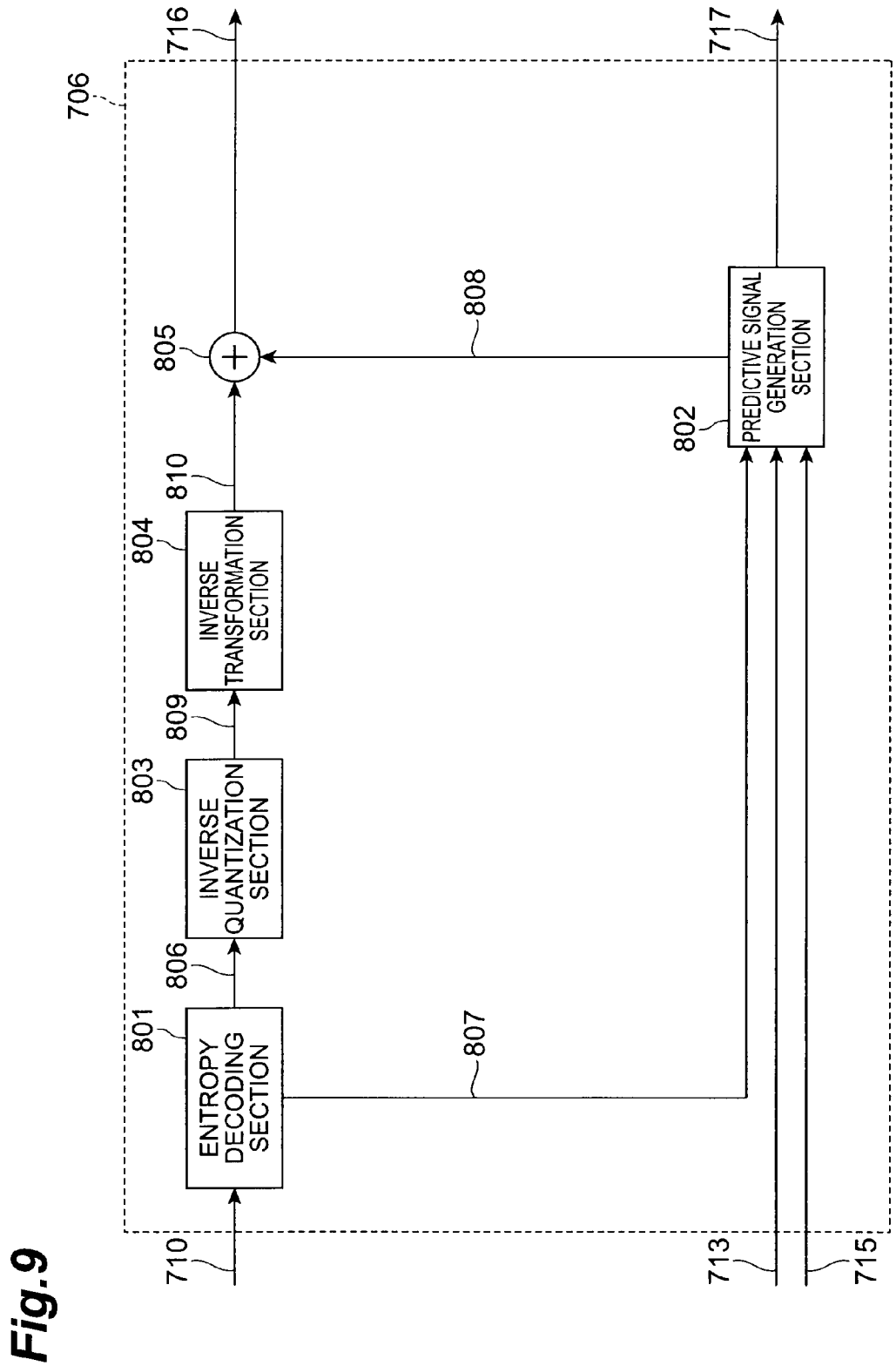
FIG. 9 is a constitutional view of a decoding section which is provided in the moving image decoding device according to the first embodiment of the present invention.

The decoding section 706 will now be described in more detail by using FIG. 9.

The decoding section 706 is constituted comprising, as functional constituent elements, an entropy decoding section 801, a predictive signal generation section 802, an inverse quantization section 803, an inverse transformation section 804, and an adder 805.

The entropy decoding section 801 decodes a quantization orthogonal transformation coefficient 806 and encoding information 807 from the input compressed data 710 and sends the quantization orthogonal transformation coefficient 806 to the inverse quantization section 803 and sends the encoding information 807 to the predictive signal generation section 802.

The predictive signal generation section 802 generates a predictive signal 808 for the decoding target blocks by using the encoding information 807 sent by the entropy decoding section 801, the inverted reference image 713 and the inverted reference image accompanying information 715 and sends the predictive signal 808 to the adder 805. Furthermore, the predictive signal generation section 802 outputs the inverted decoded image accompanying information 717.

The inverse quantization section 803 generates a decoding orthogonal transformation coefficient 809 by performing inverse quantization on the quantization orthogonal transformation coefficient 806 sent by the entropy decoding section 801 and sends the decoding orthogonal transformation coefficient 809 to the inverse transformation section 804.

The inverse transformation section 804 generates a decoding residual signal 810 by performing inverse orthogonal transformation on the decoding orthogonal transformation coefficient 809 sent by the inverse quantization section 803 and sends the decoding residual signal 810 to the adder 805.

The adder 805 generates an inverted decoded image 716 by adding a predictive signal 808 sent by the predictive signal generation section 802 and the decoding residual signal 810 sent by the inverse transformation section 804 and outputs the inverted decoded image 716.

An example of the inverted reference image accompanying information that can be cited is an inverted motion vector. In this case, the predictive signal generation section 802 may use the B-picture temporal direct mode predictive system of the H.264/AVC encoding system and generate the predictive value for the decoding target block by utilizing the inverted reference image and inverted motion vector. In addition, as per FIG. 6, the predictive signal generation section 802 may make a signal pattern in a position that has moved through a vector of a motion vector differential value contained in the encoding information 807 from the center of the search on the inverted reference image the predictive value for the decoding target block, with the pointer of the inverted motion vector in the same position as the decoding target block serving as the center of the search. The predictive signal generation section 802 is able to use a variety of systems other than that of generating a predictive signal for a decoded image from the reference image and the motion vector which accompanies the reference image.

Figure 10:
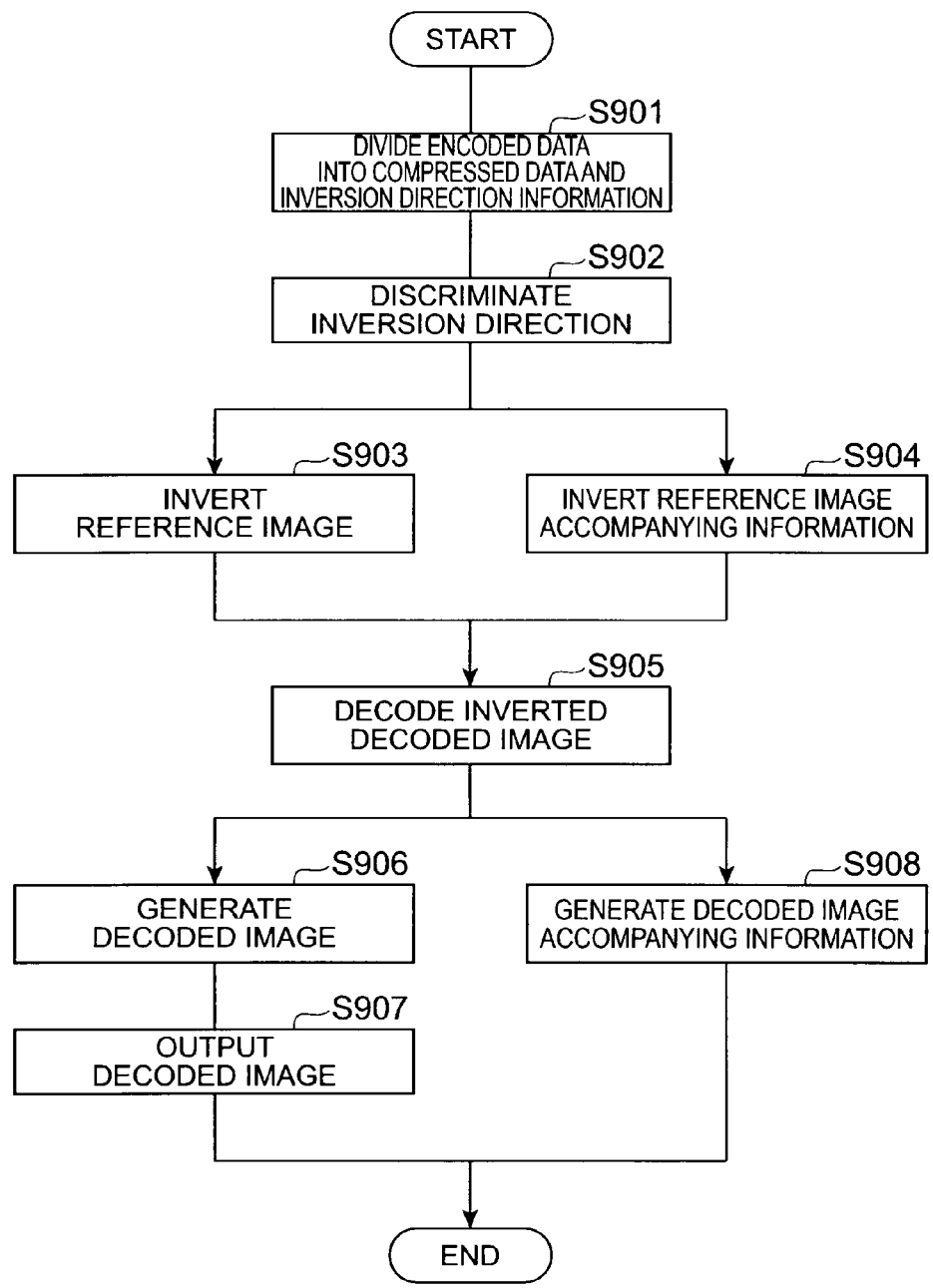
FIG. 10 is a flowchart showing the moving image decoding method according to the first embodiment of the present invention.
Figure 11:
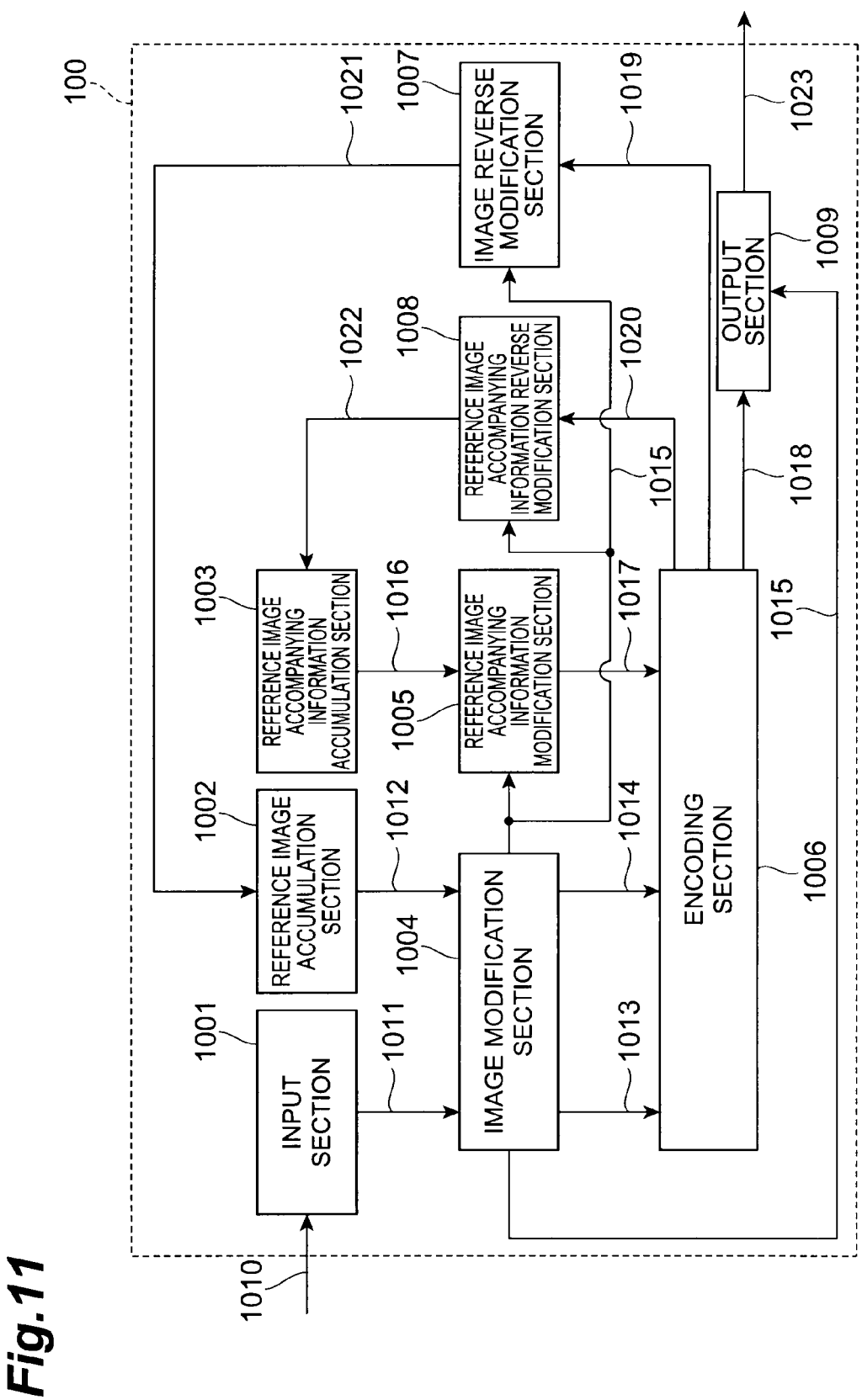
FIG. 11 is a constitutional view of a moving image encoding device according to a second embodiment of the present invention.

The operation of the moving image decoding device 70 according to the present invention will be described next by using FIG. 10. The operation of the moving image decoding device 70 according to the present invention can be executed by a program.

First, the division section 701 divides the encoded data 709 that are input after being transmitted from the outside into compressed data 710 and inversion direction information 711 (step S901) and discriminates the inversion direction (step S902).

Thereafter, the image inversion section 704 uses the inversion direction information 711 sent by the division section 701 to invert a reference image 712 sent by the reference image accumulation section 702 and generate the inverted reference image 713 (step S903). In addition, the reference image accompanying information inversion section 705 uses the inversion direction information 711 sent by the division section 701 to invert the reference image accompanying information 714 sent by the reference image accompanying information accumulation section 703 and create the inversion reference image accompanying information 715 (step S904).

Thereafter, the decoding section 706 generates a predictive signal for the decoded image by using compressed data 710 sent by the division section 701, an inverted reference image 713 sent by the image inversion section 704, and inverted reference image accompanying information 715 sent by the reference image accompanying information inversion section 705, and performs decoding on the inverted decoded image (step S905).

The image reverse inversion section 707 then uses the inversion direction information 711 sent by the division section 701 to invert the inverted decoded image 716 sent by the decoding section 706 in the opposite direction from the inversion direction of the inversion direction information 711 and generate the decoded image 718 (step S906). In addition, the image reverse inversion section 707 outputs the decoded image 718 to an external device (not shown) such as a moving image display device (step S907).

In addition, the reference image accompanying information reverse inversion section 708 uses the inversion direction information 711 sent by the division section 701 to invert the inverted decoded image accompanying information sent by the decoding section 706 in the opposite direction from the inversion direction of the inversion direction information and generate the decoded image accompanying information 719 (step S908).

Figure 21:
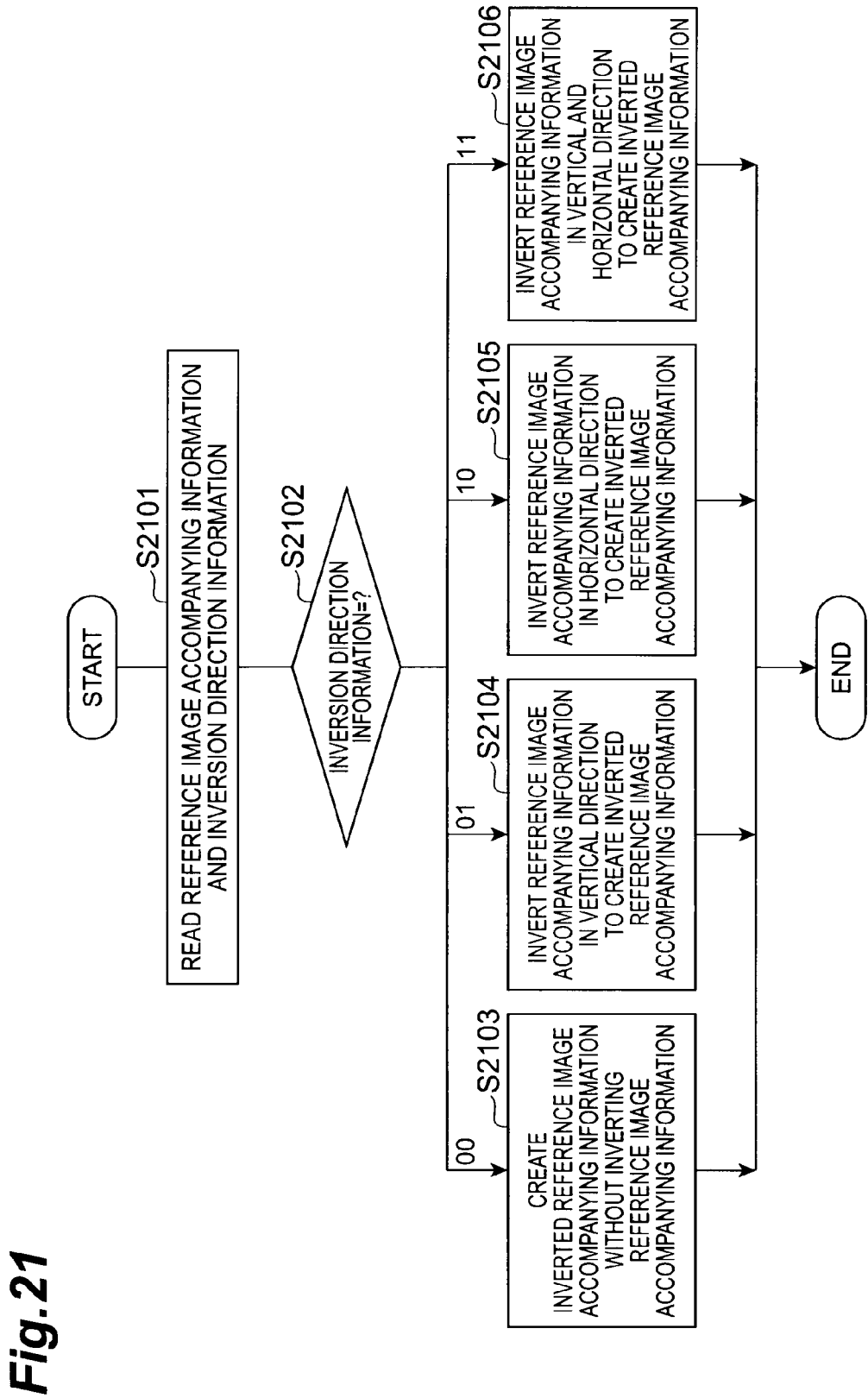
FIG. 21 is a flowchart showing a method of creating inverted reference image accompanying information.

FIG. 21 will be used next to describe a method in which the reference image accompanying information inversion section 205 and 705 use the inversion direction information 215 or 711 to invert the reference image accompanying information 216 or 714 and create inverted reference image accompanying information 217 or 715.

First, the reference image accompanying information inversion section reads the reference image accompanying information and inversion direction information (step S2101) and judges the values of the inversion direction information (step S2102). In cases where the inversion direction information is '00', the reference image accompanying information inversion section does not invert the reference image accompanying information but instead leaves the inverted reference image accompanying information as is (step S2103). In cases where the inversion direction information is '01', the reference image accompanying information inversion section inverts the reference image accompanying information in a vertical direction to create inverted reference image accompanying information (step S2104). In cases where the inversion direction information is '10', the reference image accompanying information inversion section inverts the reference image accompanying information in a horizontal direction to create the inverted reference image accompanying information (step S2105). In cases where the inversion direction information is '11', the reference image accompanying information inversion section inverts the reference image accompanying information in a vertical and horizontal direction to create inverted reference image accompanying information (step S2106).

The inversion direction information which indicates the inversion direction is not limited to the above value but rather a variety of information identifying the inversion direction can be employed.

Figure 22:
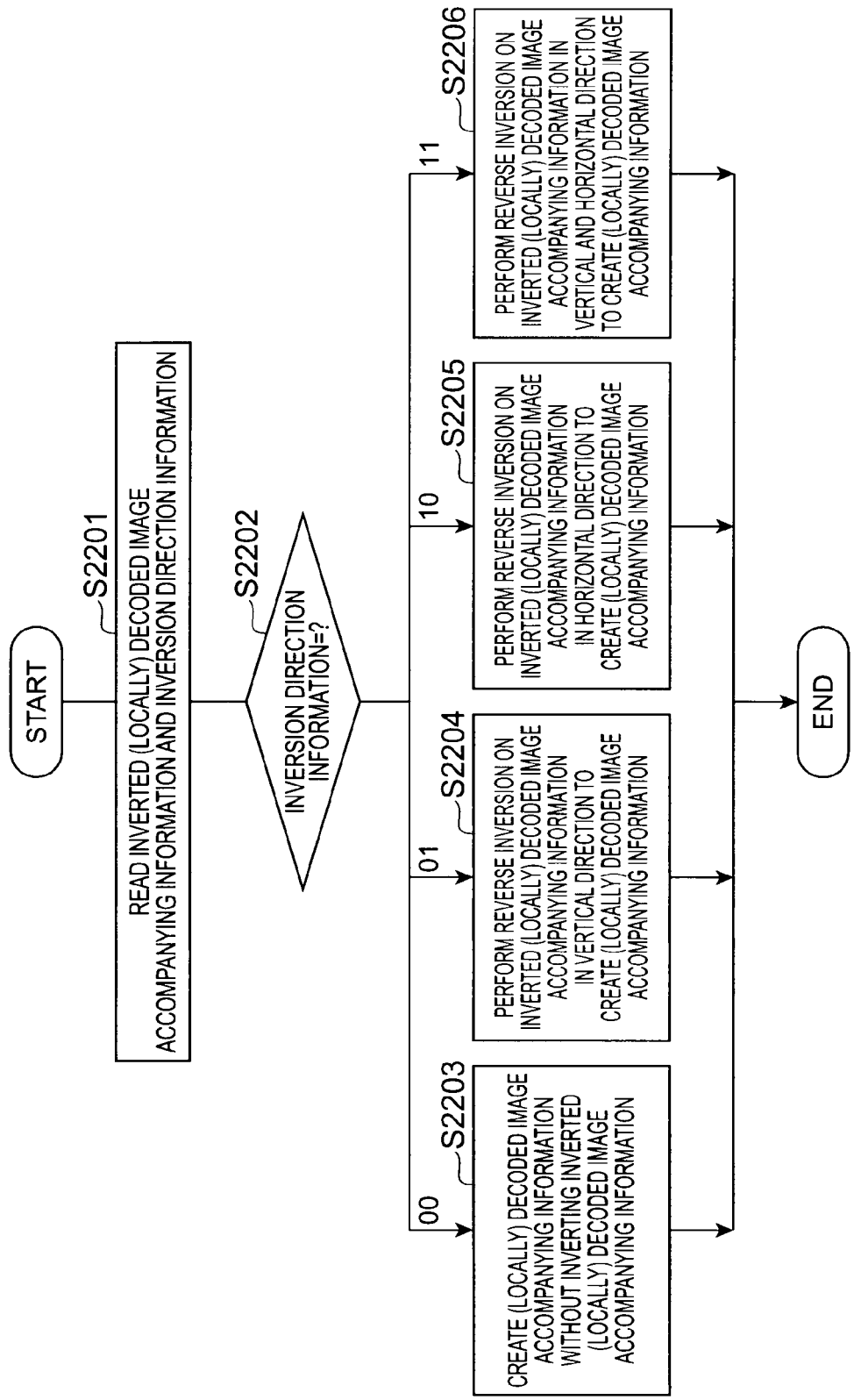
FIG. 22 is a flowchart showing a method of creating image accompanying information.

FIG. 22 will be used next to describe a method in which the reference image accompanying information reverse inversion sections 208 and 708 uses the inversion direction information 215 or 711 to perform reverse inversion on the inverted locally decoded image accompanying information 220 or inverted decoded image accompanying information 717 to create the locally decoded image accompanying information 222 or decoded image accompanying information 719.

First, the reference image accompanying information reverse inversion section reads (locally) decoded image accompanying information and inversion direction information (step S2201) and judges the value of the inversion direction information (step S2202). In cases where the inversion direction information is '00', the reference image accompanying information reverse inversion section does not invert the (locally) decoded image accompanying information but instead leaves the inverted (locally) decoded image accompanying information as is (step S2203). In cases where the inversion direction information is '01', the reference image accompanying information reverse inversion section performs reverse inversion on the inverted (locally) decoded image accompanying information in a vertical direction to create (locally) decoded image accompanying information (step S2204). In cases where the inversion direction information is '10', the reference image accompanying information reverse inversion section performs reverse inversion on the inverted (locally) decoded image accompanying information in a horizontal direction to create (locally) decoded image accompanying information (step S2205). In cases where the inversion direction information is '11', the reference image accompanying information reverse inversion section performs reverse inversion on the transformed (locally) decoded image accompanying information in a vertical and horizontal direction to create (locally) decoded image accompanying information (step S2206).

The inversion direction information which indicates the inversion direction is not limited to the above value but rather a variety of information identifying the inversion direction can be employed.

According to the first embodiment, the moving image encoding device 20 generates a predictive signal by inverting the reference image and the information accompanying the reference image in the inversion direction of the input image and is therefore able to correctly encode the input image. In addition, the moving image decoding device 70 is able to correctly decode the decoded image by generating a predictive signal by inverting the reference image and the information accompanying the reference image together with the transmitted inversion direction information. That is, the image encoding and decoding can be more efficiently performed by generating a precise predictive signal.

In addition, the moving image encoding device 20 performs reverse modification on the locally decoded image that has been locally decoded and performs reverse modification on the information which accompanies the locally decoded image. Therefore, a reference image which corresponds with the input image which is input next and reference image accompanying information can be generated. In addition, the moving image decoding device 70 performs reverse modification on the decoded image that has been decoded and performs reverse modification on the information accompanying the decoded image and is therefore able to generate a reference image which corresponds with the decoded image that is input next as well as the reference image accompanying information.

Figure 19:
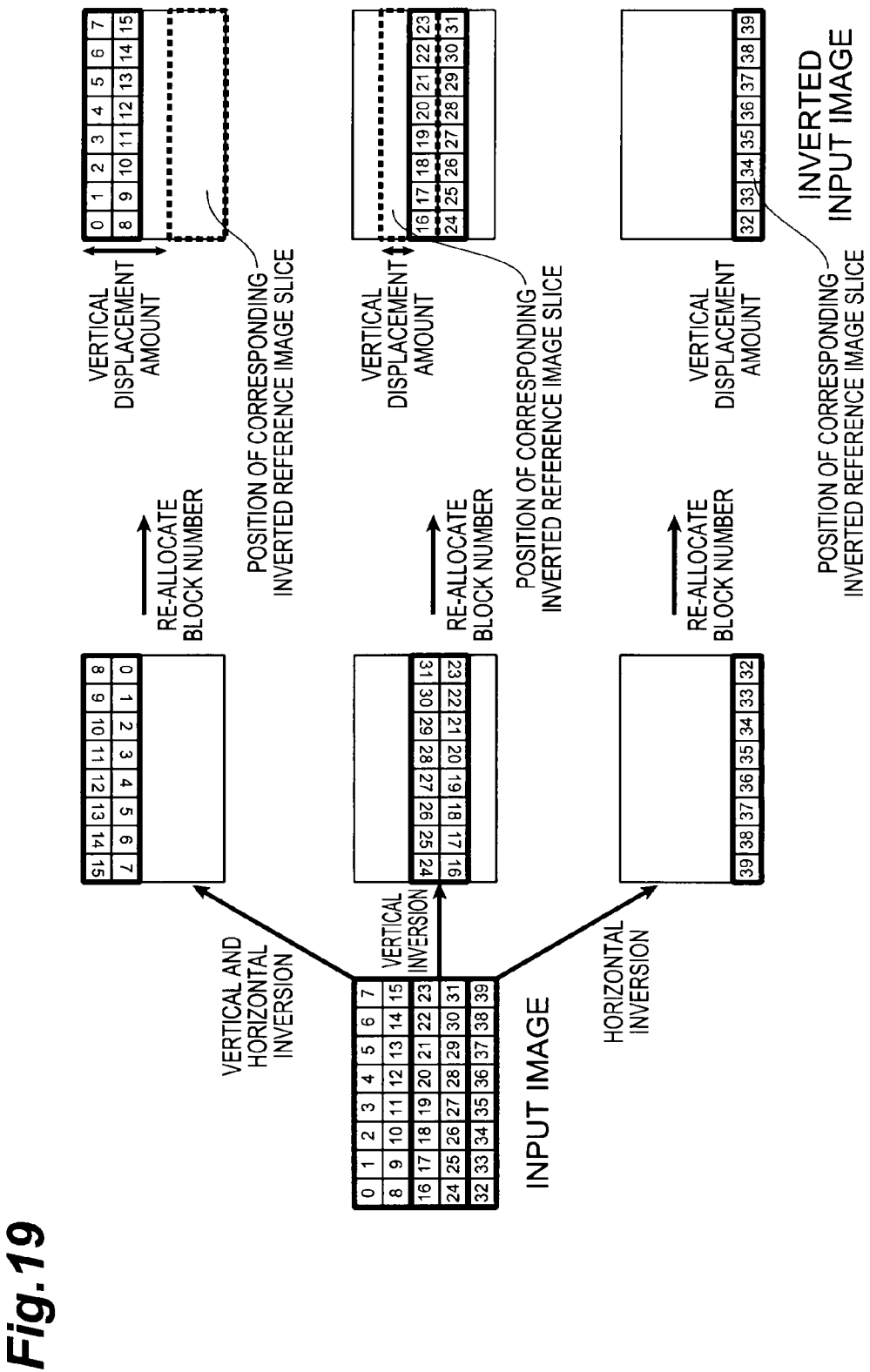
FIG. 19 serves to illustrate a case where an input image is inverted in slice units comprising block groups of a plurality of columns according to the first embodiment of the present invention.

The units for inverting the input image may be, in addition to frame by frame inversion, slice by slice or block by block inversion. FIG. 19 shows an example of a case where an input image is inverted in slices which comprise a block group of a plurality of columns in a frame. A slice which is constituted by blocks 0 to 15 is inverted in a vertical and horizontal direction; a slice which is constituted by blocks 16 to 31 is inverted in a vertical direction; and a slice which is constituted by blocks 32 to 39 is inverted in a horizontal direction. In this case, an encoding device transmits inversion direction information in respective slice units and the displacement amount in a perpendicular direction to the position of the corresponding slice of the reference image. In addition, the decoding device receives the inversion direction information in the respective slice units and the displacement amount in the perpendicular direction to the position of the corresponding slice of the reference image.

Figure 20:
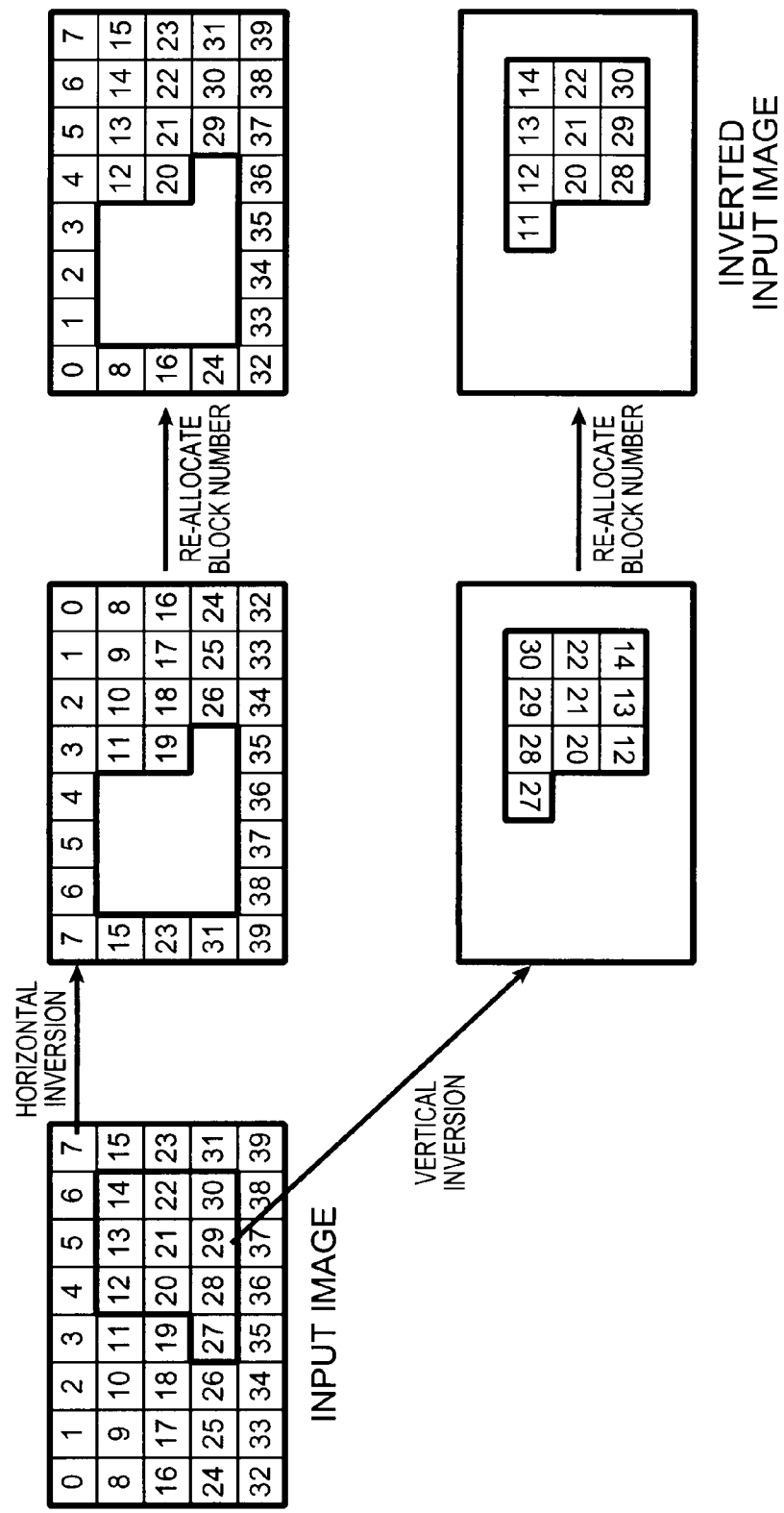
FIG. 20 serves to illustrate a case where an input image is inverted in slice units comprising block groups of an optional shape according to the first embodiment of the present invention.

In addition, FIG. 20 shows an example of a case where an input image is inverted in slices which comprise a block group of an optional shape in the frame. A slice which comprises blocks 12 to 14, 20 to 22, and 27 to 30 is inverted in a vertical direction while a slice comprising the remaining blocks is inverted in a horizontal direction. In this case, the encoding device transmits inversion direction information in respective slice units and information indicating the position and shape of the corresponding slice in the reference image based on the block signal in the slice. Furthermore, the decoding device receives inversion direction information in respective slice units and information indicating the position and shape of the corresponding slice in the reference image based on the block number in the slice.

In the moving image encoding device 20, the encoding section 206 may also have the functions of the image inversion section 204 and the reference image accompanying information inversion section 205. In addition, in the moving image decoding device 70, the decoding section 706 may also have the functions of the image inversion section 704 and the reference image accompanying information inversion section 705.

Second Embodiment

The moving image encoding device according to the present invention will now be described by using FIG. 1.

The moving image encoding device 100 according to the present invention is constituted comprising, as functional constituent elements, an input section 1001 (input means), a reference image accumulation section 1002 (reference image accumulation means), a reference image accompanying information accumulation section 1003 (reference image accompanying information accumulation means), an image modification section 1004 (image modification means), a reference image accompanying information modification section 1005 (reference image accompanying information modification means), an encoding section 1006 (encoding means), an image reverse modification section 1007 (image reverse modification section), a reference image accompanying information reverse modification section 1008 (reference image accompanying information reverse modification means), and an output section 1009 (output means).

An input section 1001 divides an input moving image signal 1010 into frame images and sends the frame images to the image modification section 1004 as an input image 1011.

A reference image accumulation section 1002 is a part that accumulates a reference image which is a locally decoded image of an image that has been previously encoded. The reference image accumulation section 1002 sends a reference image 1012 to the image modification section 1004.

The image modification section 1004 performs inversion on the input image 1011 sent by the input section 1001 by making a modification such as a rotation, an enlargement, or a reduction to create a modified input image 1013 which the image modification section 1004 then sends to the encoding section 1006. Furthermore, the image modification section 1004 modifies the reference image 1012 sent by the reference image accumulation section 1002 in the same direction as the direction of modification of the input image 1011 to create a modified reference image 1014 which the image modification section 1004 then sends to the encoding section 1006. Furthermore, the image modification section 1004 sends modification method information 1015 which indicates the modification method of the input image 1011 to the reference image accompanying information modification section 1005, the image reverse modification section 1007, the reference image accompanying information reverse modification section 1008, and the output section 1009.

The reference image accompanying information accumulation section 1003 is a part which accumulates the reference image accompanying information which is information which accompanies the reference image which is a locally decoded image of a previously encoded image. The reference image accompanying information accumulation section 1003 sends reference image accompanying information 1016 to the reference image accompanying information modification section 1005.

The reference image accompanying information modification section 1005 uses the modification method information 1015 sent by the image modification section 1004 to modify the reference image accompanying information 1016 sent by the reference image accompanying information accumulation section 1003 by means of the same method as the modification method for the input image and create modified reference image accompanying information 1017 which the reference image accompanying information modification section 1005 then sends to the encoding section 1006.

The encoding section 1006 uses the modified reference image 1014 sent by the image modification section 1004 and the modified reference image accompanying information 1017 sent by the reference image accompanying information modification section 1005 to generate a predictive signal for the modified input image 1013 sent by the image modification section 1004 and encodes the modified input image. The encoding section 1006 sends the compressed data 1018 obtained by encoding the modified input image to the output section 1009. In addition, the encoding section 1006 sends the modified locally decoded image 1019 that has been modified and locally decoded to the image reverse modification section 1007. Furthermore, the encoding section 1006 sends the modified locally decoded image accompanying information 1020 to the reference image accompanying information reverse modification section 1008.

The image reverse modification section 1007 uses the modification method information 1015 sent by the image modification section 1004 to modify the modified locally decoded image 1019 sent by the encoding section 1006 by means of the opposite method from the method of modifying the input image and generate a locally decoded image 1021 which the image reverse modification section 1007 then sends to the reference image accumulation section 1002 for use as a reference image in the next frame and subsequent frames.

The reference image accompanying information reverse modification section 1008 uses the modification method information 1015 sent by the image modification section 1004 to modify the modified locally decoded image accompanying information sent by the encoding section 1006 by means of a method which is the reverse of the modification method of the input image and generate locally decoded image accompanying information 1022 before sending to the reference image accompanying information accumulation section 1003 for use as reference image accompanying information in the next frame and subsequent frames.

The output section 1009 combines the modification method information 1015 sent by the image modification section 1004 and the compressed data 1018 sent by the encoding section 1006 and transmits the result to the outside as encoded data 1023.

The modification method is not limited to rotation, enlargement, or reduction of the image and the reference image accompanying information. A variety of modification methods including the image inversion of the first embodiment can also be employed. In addition, the modification method of the reverse method is not limited to the reverse rotation, reduction, or enlargement of the image and the reference image accompanying information. A variety of modification methods for removing the effects of the modification can also be employed.

In addition, as an example of an encoding system that is used by the encoding section 1006, the H.264/AVC encoding system may be cited. However, the encoding system is not limited to the H.264/AVC encoding system. Encoding methods of a variety of systems that perform encoding by generating a predictive signal of an input image from a reference image and the information accompanying the reference image can be applied.

The detailed description of the encoding section 1006 is the same as the detailed description of the encoding section 206 of the first embodiment.

Figure 12:
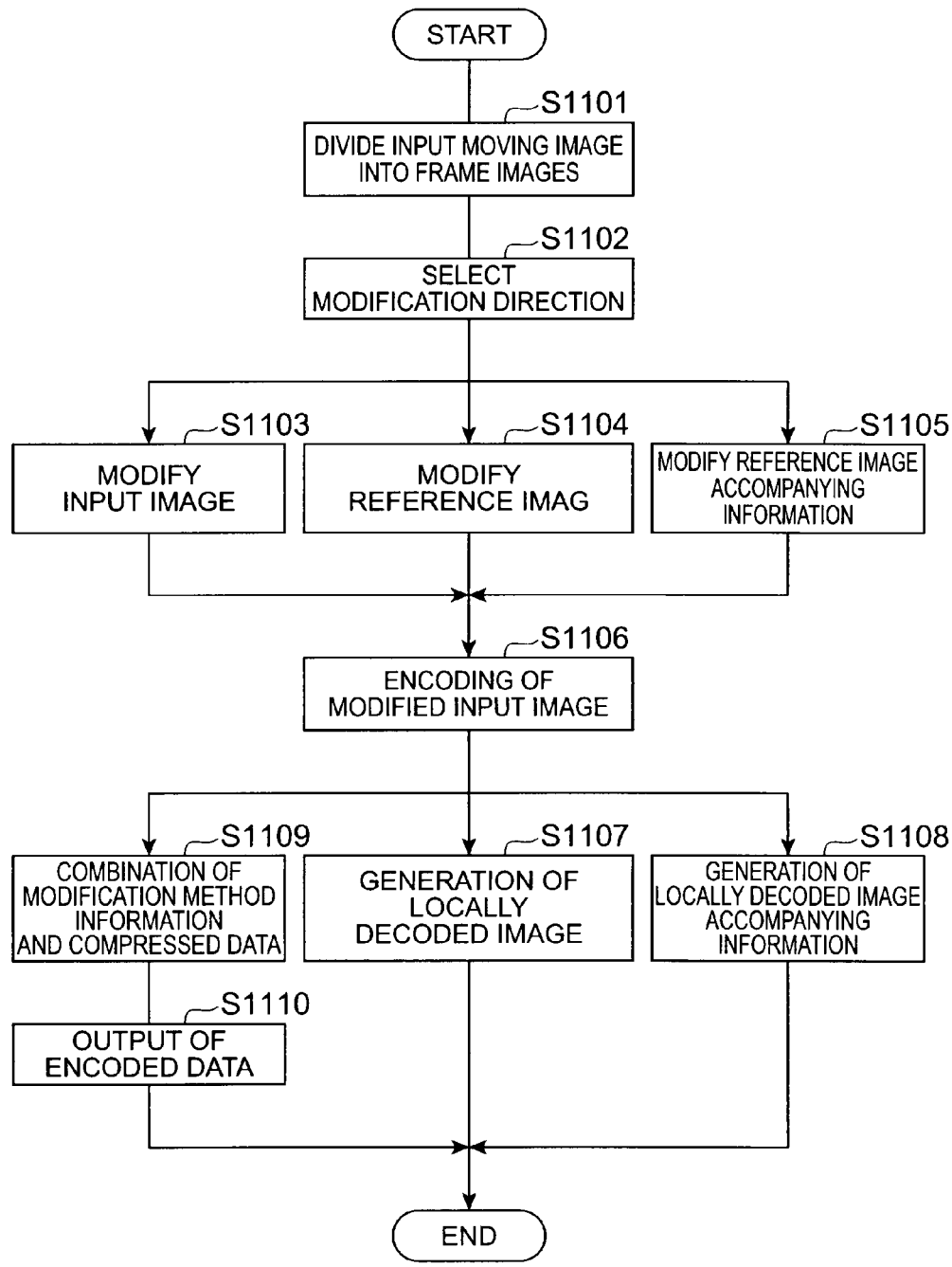
FIG. 12 is a flowchart showing a moving image encoding method according to the second embodiment of the present invention.

The operation of the moving image encoding device 100 according to the present invention will be described next by using FIG. 12. The operation of the moving image encoding device 100 according to the present invention can be executed by a program.

First, the moving image signal 1010 input by the input section 1001 is divided into frame images (step S1101). The image modification section 1004 then modifies the input image 1011 sent by the input section 1001 after determining the modification method such as rotation, enlargement, or reduction (step S1102) and creates the modification input image 1013 (step S1103). Furthermore, the image modification section 1004 modifies reference image 1012 sent by the reference image accumulation section 1002 by means of the same method as the modification method for input image 1011 and creates the modified reference image 1014 (step S1104). Further, the reference image accompanying information modification section 1005 uses the modification method information 1015 sent by the image modification section 1004 to modify the reference image accompanying information 1016 by means of the same method as the modification method for the input image and creates the modified reference image accompanying information 1017 (step S1105).

Thereafter, the encoding section 1006 uses the modified reference image 1014 sent by the image modification section 1004 and the modified reference image accompanying information 1017 sent by the reference image accompanying information modification section 1005 to generate a predictive signal for the modified input image 1013 sent by the image modification section 1004 and encode the modified input image (step S106).

Thereafter, the image reverse modification section 1007 uses the modification method information 1015 sent by the image modification section 1004 to modify the modified locally decoded image 1019 sent by the encoding section 1006 by means of a method which is the reverse of the modification method of the input image and generate a locally decoded image 1021 (step S1107). In addition, the reference image accompanying information reverse modification section 1008 uses the modification method information 1015 sent by the image modification section 1004 to modify the modified locally decoded image accompanying information sent by the encoding section 1006 by means of a method which is the reverse of the modification method of the input image and generate locally decoded image accompanying information 1022 (step S1108).

In addition, the output section 1009 combines the modification method information 1015 sent by the image modification section 1004 and the compressed data 1018 sent by the encoding section 1006 (step S1109) and transmits the result to the outside as encoded data 1023 (step S1110).

Figure 13:
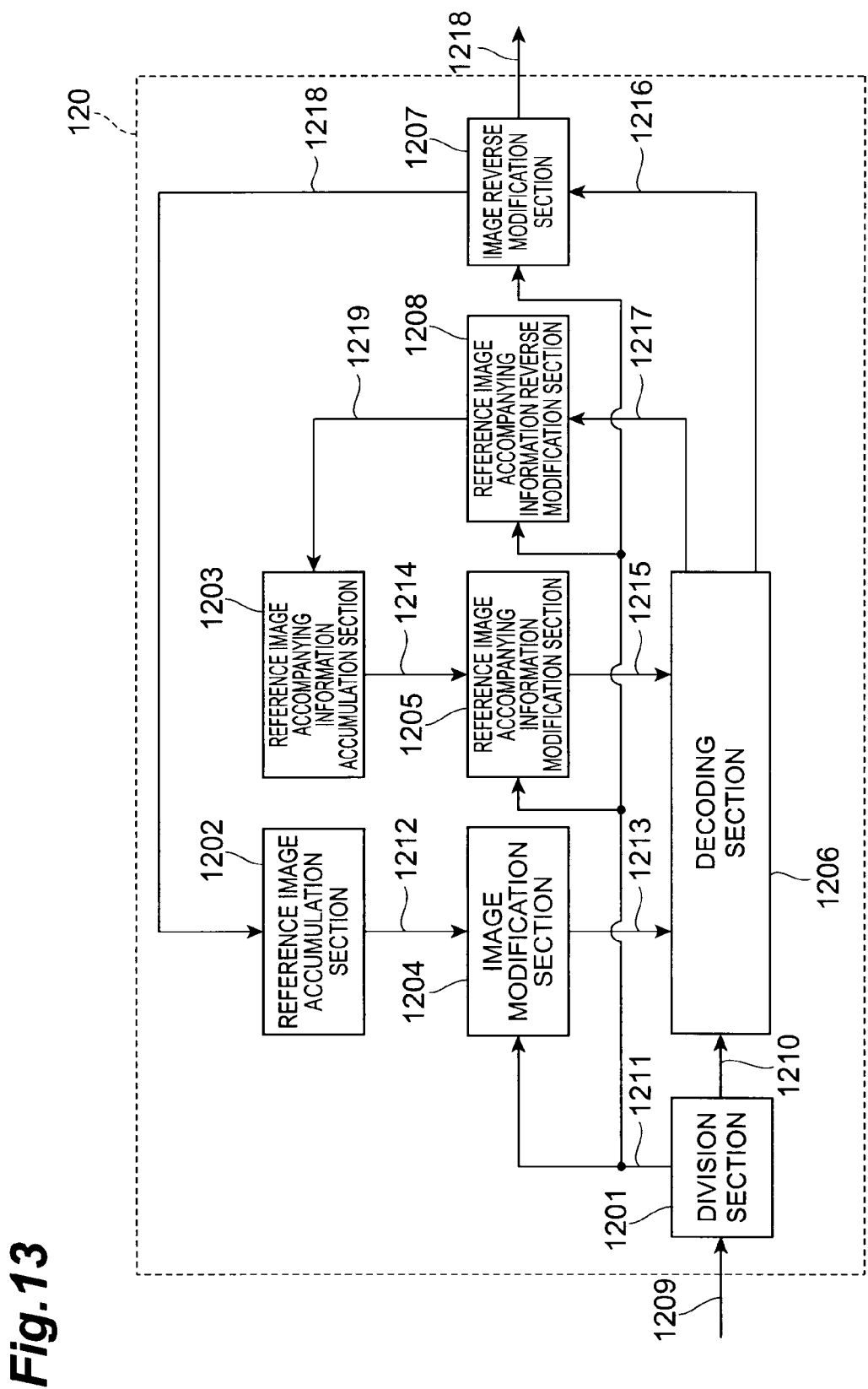
FIG. 13 is a constitutional view of the moving image decoding device according to the second embodiment of the present invention.

The moving image decoding device according to the present invention will be described next by using FIG. 13.

A moving image decoding device 120 according to the present invention is constituted comprising, as functional constituent elements, a division section 1201 (division means), a reference image accumulation section 1202 (reference image accumulation means), a reference image accompanying information accumulation section 1203 (reference image accompanying information accumulation means), an image modification section 1204 (image modification means), a reference image accompanying information modification section 1205 (reference image accompanying information modification means), a decoding section 1206 (decoding means), an image reverse modification section 1207 (image reverse modification means), and a reference image accompanying information reverse modification section 1208 (reference image accompanying information reverse modification means).

The division section 1201 divides the encoded data 1209 that are input after being transmitted from the outside into compressed data 1210 and modification method information 1211. The division section 1201 sends the compressed data 1210 to the decoding section 1206. In addition, the division section 1201 sends the modification method information 1211 to the image modification section 1204, the reference image accompanying information modification section 1205, the image reverse modification section 1207, and the reference image accompanying information reverse modification section 1208.

The reference image accumulation section 1202 is a part that accumulates a reference image which is a previously decoded image. The reference image accumulation section 1202 sends a reference image 1212 to the image modification section 1204.

The image modification section 1204 uses the modification method information 1211 sent by the division section 1201 to modify the reference image 1212 sent by the reference image accumulation section 1202 and generate a modified reference image 1213 which the image modification section 1204 then sends to the decoding section 1206.

The reference image accompanying information accumulation section 1203 is a part which accumulates the reference image accompanying information which is information accompanying the reference image which is a previously decoded image. The reference image accompanying information accumulation section 1203 sends reference image accompanying information 1214 to the reference image accompanying information modification section 1205.

The reference image accompanying information modification section 1205 uses the modification method information 1211 sent by the division section 1201 to modify the reference image accompanying information 1214 sent by the reference image accompanying information accumulation section 1203 and create modified reference image accompanying information 1215 which the reference image accompanying information modification section 1205 then sends to the encoding section 1206.

The decoding section 1206 uses the compressed data 1210 sent by the division section 1201, the modified reference image 1213 sent by the image modification section 1204, and the modified reference image accompanying information 1215 sent by the reference image accompanying information modification section 1205 to generate a predictive signal for the decoded image and decode the modified decoded image. The decoding section 1206 sends the modified decoded image 1216 which has been modified and decoded to the image reverse modification section 1207. Furthermore, the decoding section 1206 sends the modified decoded image accompanying information 1217 to the reference image accompanying information reverse modification section 1208.

The image reverse modification section 1207 uses the modification method information 1211 sent by the division section 1201 to modify the modified decoded image 1216 sent by the decoding section 1206 by means of a method which is the reverse of the modification method of the modification method accompanying information 1211 and generates the decoded image 1218 before sending to the reference image accumulation section 1202 for use as a reference image in the next frame and subsequent frames. Furthermore, the image reverse modification section 1207 outputs the decoded image 1218 to an external device (not shown) such as a moving image display device.

The reference image accompanying information reverse modification section 1208 uses the modification method information 1211 sent by the division section 1201 to modify the modified decoded image accompanying information 1217 sent by the decoding section 1206 by means of a method which is the reverse of the modification method of the modification method information and generate decoded image accompanying information 1219 before sending to the reference image accompanying information accumulation section 1203 for use as reference image accompanying information in the next frame and subsequent frames.

The modification method is not limited to rotation, enlargement, or reduction of the image and the reference image accompanying information. A variety of modification methods including the image inversion of the first embodiment can also be employed. In addition, the modification method of the reverse method is not limited to the reverse rotation, reduction, or enlargement of the image and the reference image accompanying information. A variety of modification methods for removing the effects of the modification can also be employed.

In addition, as an example of a decoding system that is used by the decoding section 1206, the H.264/AVC decoding system may be cited. However, the decoding system is not limited to the H.264/AVC decoding system. Decoding methods of a variety of systems that perform decoding by generating a predictive signal for a decoded image from a reference image and the information accompanying the reference image can be applied.

The detailed description of the decoding section 1206 is the same as the detailed description of the decoding section 706 of the first embodiment.

Figure 14:
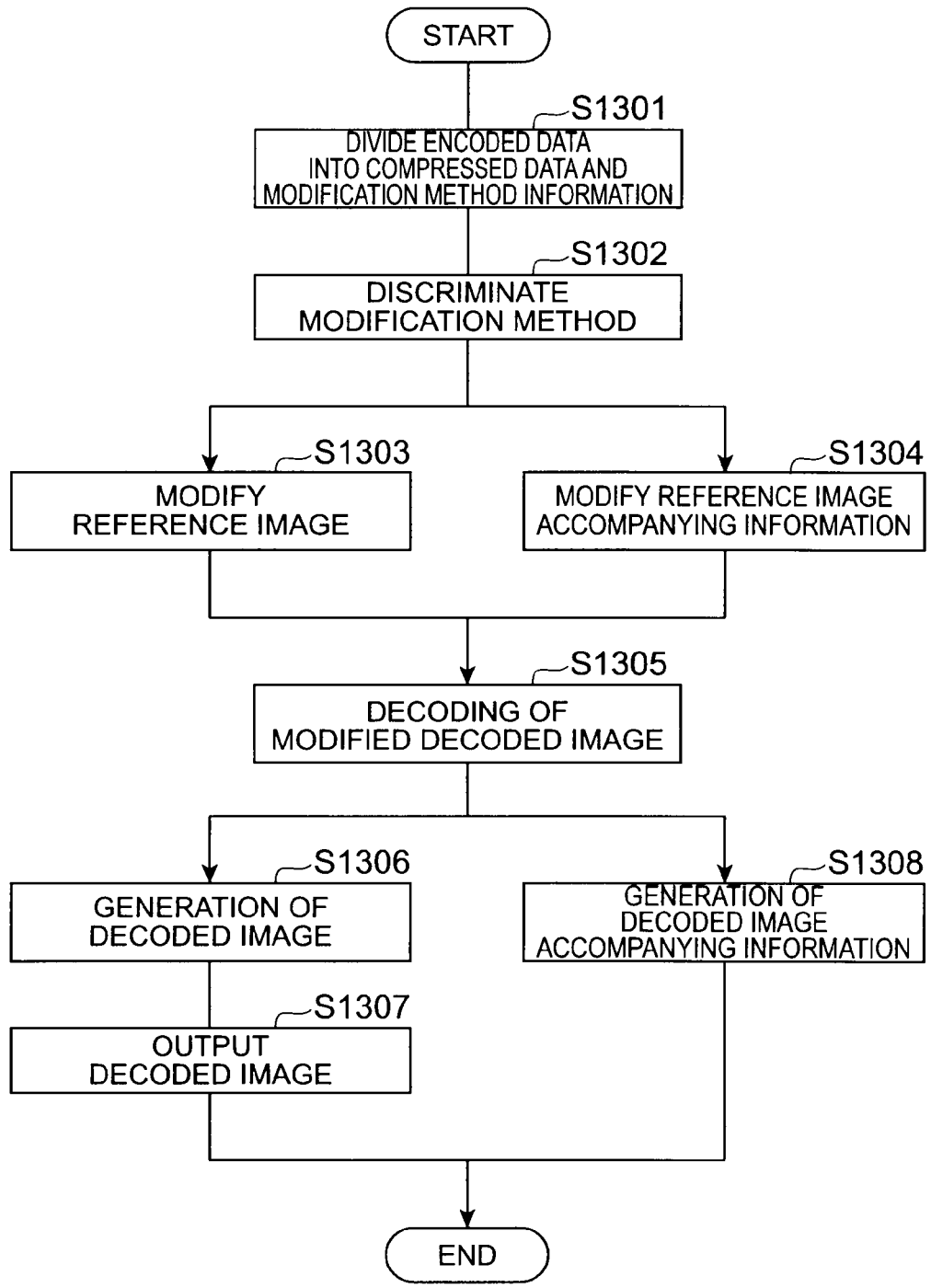
FIG. 14 is a flowchart showing a moving image decoding method according to the second embodiment of the present invention.

The operation of the moving image decoding device 120 according to the present invention will be described next by using FIG. 14. The operation of the moving image decoding device 120 according to the present invention can be executed by a program.

First, the division section 1201 divides the encoded data 1209 that are input after being transmitted from the outside into the compressed data 1210 and the modification method information 1211 (step S1301) and discriminates the modification method (step S1302).

Thereafter, the image modification section 1204 uses the modification method information 1211 sent by the division section 1201 to modify a reference image 1212 sent by the reference image accumulation section 1202 and generate the modified reference image 1213 (step S1303). In addition, the reference image accompanying information modification section 1205 uses the modification method information 1211 sent by the division section 1201 to modify the reference image accompanying information 1214 sent by the reference image accompanying information accumulation section 1203 and create the modified reference image accompanying information 1215 (step S1304).

Thereafter, the decoding section 1206 generates a predictive signal for the decoded image by using the compressed data 1210 sent by the division section 1201, the modified reference image 1213 sent by the image modification section 1204, and the modified reference image accompanying information 1215 sent by the reference image accompanying information modification section 1205, and performs decoding on the modified decoded image (step S1305).

The image reverse modification section 1207 then uses the modification method information 1211 sent by the division section 1201 to modify the modified decoded image 1216 sent by the decoding section 1206 by means of a method which is the reverse of the modification method of the modification method information 1211 and generate the decoded image 1218 (step S1306). In addition, the image reverse modification section 1207 outputs the decoded image 1218 to an external device (not shown) such as a moving image display device (step S1307).

Furthermore, the reference image accompanying information reverse modification section 1208 uses the modification method information 1211 sent by the division section 1201 to modify the modified decoded image accompanying information sent by the decoding section 1206 by means of a method which is the reverse of the modification method of the modification method information and generate decoded image accompanying information 1219 (step S1308).

According to the second embodiment above, an input image can be correctly encoded because a predictive signal is generated by modifying the reference image and information accompanying the reference image in accordance with the modification method of the input image. Furthermore, a decoded image can be correctly decoded by generating a predictive signal by modifying the reference image and the information accompanying the reference image in accordance with the transmitted modification method information. In other words, the encoding and decoding of the image can be more efficiently performed by generating an exact predictive signal.

The units for modifying the input image may be, in addition to frame by frame modification, slice by slice or block by block modification. In this case, it is assumed that the encoding device transmits the modification method information in the respective units and the decoding device receives modification method information in the respective units.

Modified Example 1 of the Second Embodiment

A modified example 1 of the second embodiment will be described next. This modified example is described for a moving image encoding device and a moving image decoding device which perform encoding and decoding with a high encoding efficiency by matching the reference image and the information accompanying the reference image with the direction and size of the input image in cases where the direction and size of the input image and reference image differ.

Figure 15:
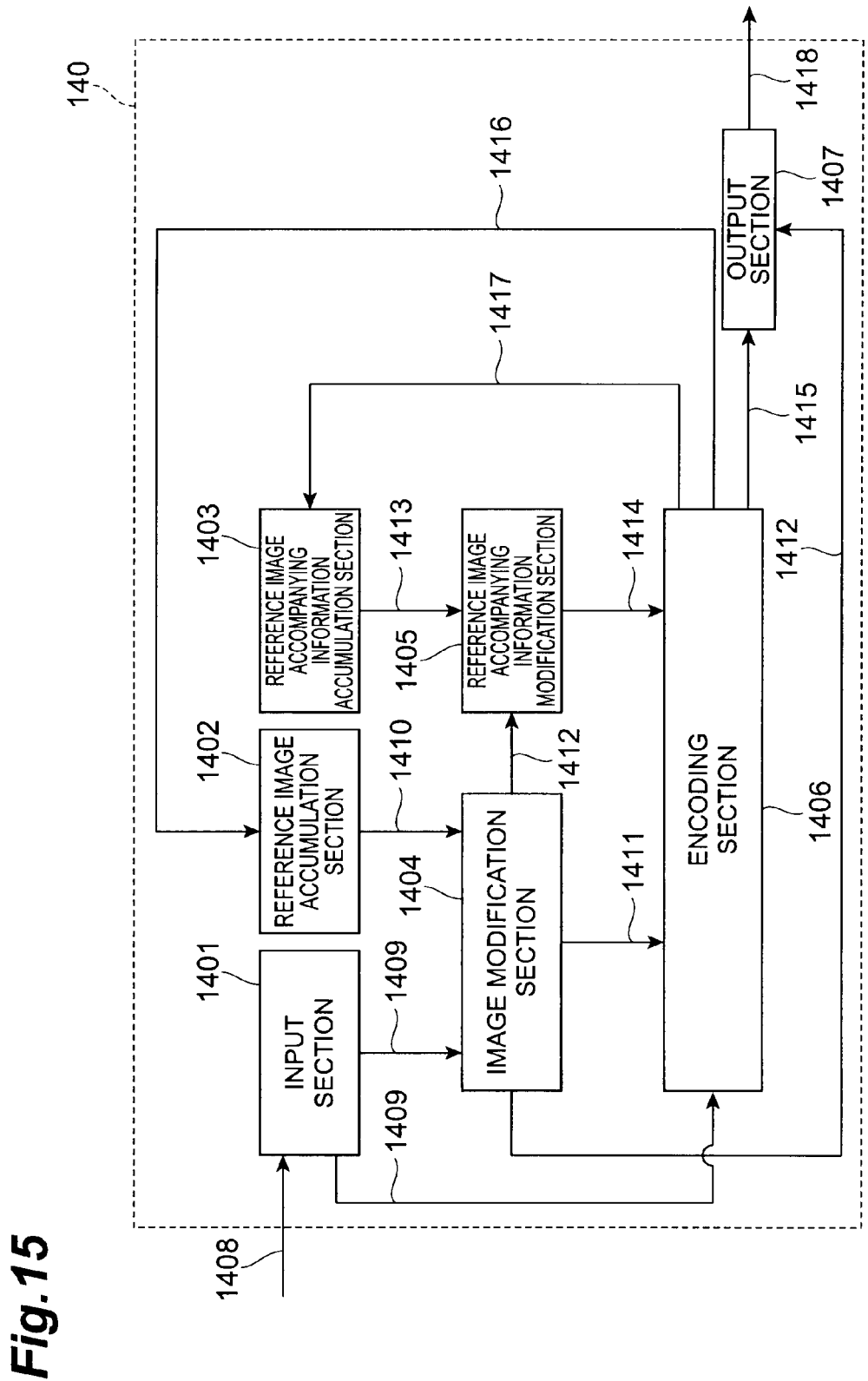
FIG. 15 is a constitutional view of a moving image encoding device according to a first modified example of the second embodiment of the present invention.

The moving image encoding device according to the present invention will now be described by using FIG. 15.

A moving image encoding device 140 according to the present invention is constituted comprising, as functional constituent elements, an input section 1401, a reference image accumulation section 1402, a reference image accompanying information accumulation section 1403, an image modification section 1404, a reference image accompanying information modification section 1405, an encoding section 1406, and an output section 1407.

The input section 1401 divides an input moving image signal 1408 into frame images and sends the frame images to the image modification section 1404 and the encoding section 1406 as an input image 1409.

The reference image accumulation section 1402 is a part that accumulates a reference image which is a locally decoded image of an image that has been previously encoded. The reference image accumulation section 1402 sends a reference image 1410 to the image modification section 1404.

The image modification section 1404 compares the input image 1409 sent by the input section 1401 and the reference image 1410 sent by the reference image accumulation section 1402 and creates a modified reference image 1411 by modifying the reference image 1410 to match the input image 1409 and sends the modified reference image 1411 to the encoding section 1406. In addition, the image modification section 1404 sends the modification method information 1412 which indicates the modification method of the reference image 1410 to the reference image accompanying information modification section 1405 and the output section 1407. As a result, the image reverse modification section of the moving image encoding device 140 of the present invention can be omitted.

The reference image accompanying information accumulation section 1403 is a part which accumulates the reference image accompanying information which is information accompanying the reference image which is a locally decoded image of a previously encoded image. The reference image accompanying information accumulation section 1403 sends reference image accompanying information 1413 to the reference image accompanying information modification section 1405.

The reference image accompanying information modification section 1405 uses the modification method information 1412 sent by the image modification section 1404 to modify the reference image accompanying information 1413 sent by the reference image accompanying information accumulation section 1403 and create modified reference image accompanying information 1414 which the reference image accompanying information modification section 1405 then sends to the encoding section 1406. The reference image accompanying information modification section 1405 thus uses the modification method information 1412 sent by the image modification section 1404 to create the modification reference image accompanying information 1414 and the reference image accompanying information reverse modification section in the moving image encoding device 140 of the present invention can be omitted.

The encoding section 1406 uses the input image 1409 sent by the input section 1401, the modified reference image 1411 sent by the image modification section 1404 and the modified reference image accompanying information 1414 sent by the reference image accompanying information modification section 1405 to generate a predictive signal for the input image 1409 and encodes the input image. The encoding section 1006 sends the compressed data 1415 obtained by encoding the input image to the output section 1407. In addition, the encoding section 1406 generates the locally decoded image 1416 that has been locally decoded and sends the locally decoded image 1416 that has been locally decoded to the reference image accumulation section 1402 for use as a reference image in the next frame and subsequent frames. In addition, the encoding section 1406 generates modified locally decoded image accompanying information 1417 and sends the modified locally decoded image accompanying information 1417 to the reference image accompanying information accumulation section 1403 for use as reference image accompanying information in the next frame and subsequent frames.

The output section 1407 combines the modification method information 1412 sent by the image modification section 1404 and the compressed data 1415 sent by the encoding section 1406 and transmits the result to the outside as encoded data 1418.

The modification method is not limited to rotation, enlargement, or reduction of the image and the reference image accompanying information. A variety of modification methods including the image inversion of the first embodiment can also be employed.

In addition, as an example of an encoding system that is used by the encoding section 1406, the H.264/AVC encoding system may be cited. However, the encoding system is not limited to the H.264/AVC encoding system. Encoding methods of a variety of systems that perform encoding by generating a predictive signal of an input image from a reference image and the information accompanying the reference image can be applied.

The detailed description of the encoding section 1406 is the same as the detailed description of the encoding section 206 of the first embodiment. The difference from the encoding section 206 lies in the fact that, whereas the encoding section 206 inputs an inverted input image 213, the encoding section 1406 inputs the input image 1409.

Figure 16:
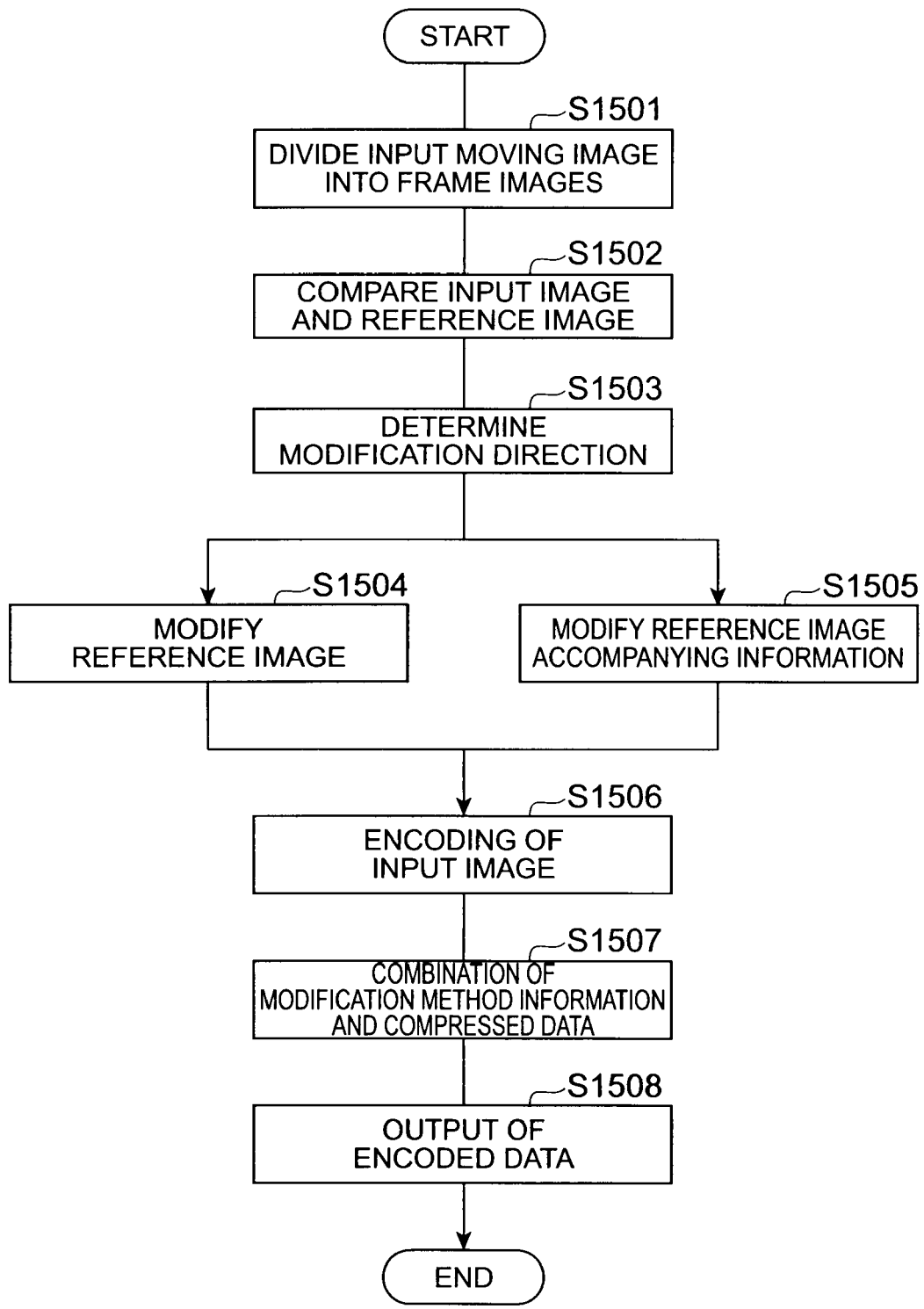
FIG. 16 is a flowchart showing a moving image encoding method according to the first modified example of the second embodiment of the present invention.

The operation of the moving image encoding device 140 according to the present invention will be described next by using FIG. 16. The operation of the moving image encoding device 140 according to the present invention can be executed by a program.

First, the moving image signal 1408 which is input by the input section 1401 is divided into frame images (step S1501). Thereafter, the image modification section 1404 compares the input image 1409 sent by the input section 1401 and the reference image 1410 sent by the reference image accumulation section 1402 (step S1502), determines the modification method for modifying the reference image 1410 to match the input image 1409 (step S1503) and creates a modified reference image 1411 (step S1504). In addition, the reference image accompanying information modification section 1405 uses the modification method information 1412 sent by the image modification section 1404 to modify the reference image accompanying information 1413 sent by the reference image accompanying information accumulation section 1403 (step S1505).

Thereafter, the encoding section 1406 uses the input image 1409 sent by the input section 1401, the modified reference image 1411 sent by the image modification section 1404, and the modified reference image accompanying information 1414 sent by the reference image accompanying information modification section 1405 to generate a predictive signal for the input image 1409 and encodes the input image (step S1506).

The output section 1407 then combines the modification method information 1412 sent by the image modification section 1404 and the compressed data 1415 sent by the encoding section 1406 (step S1507) and transmits the result to the outside as the encoded data 1418 (step S1508).

Figure 17:
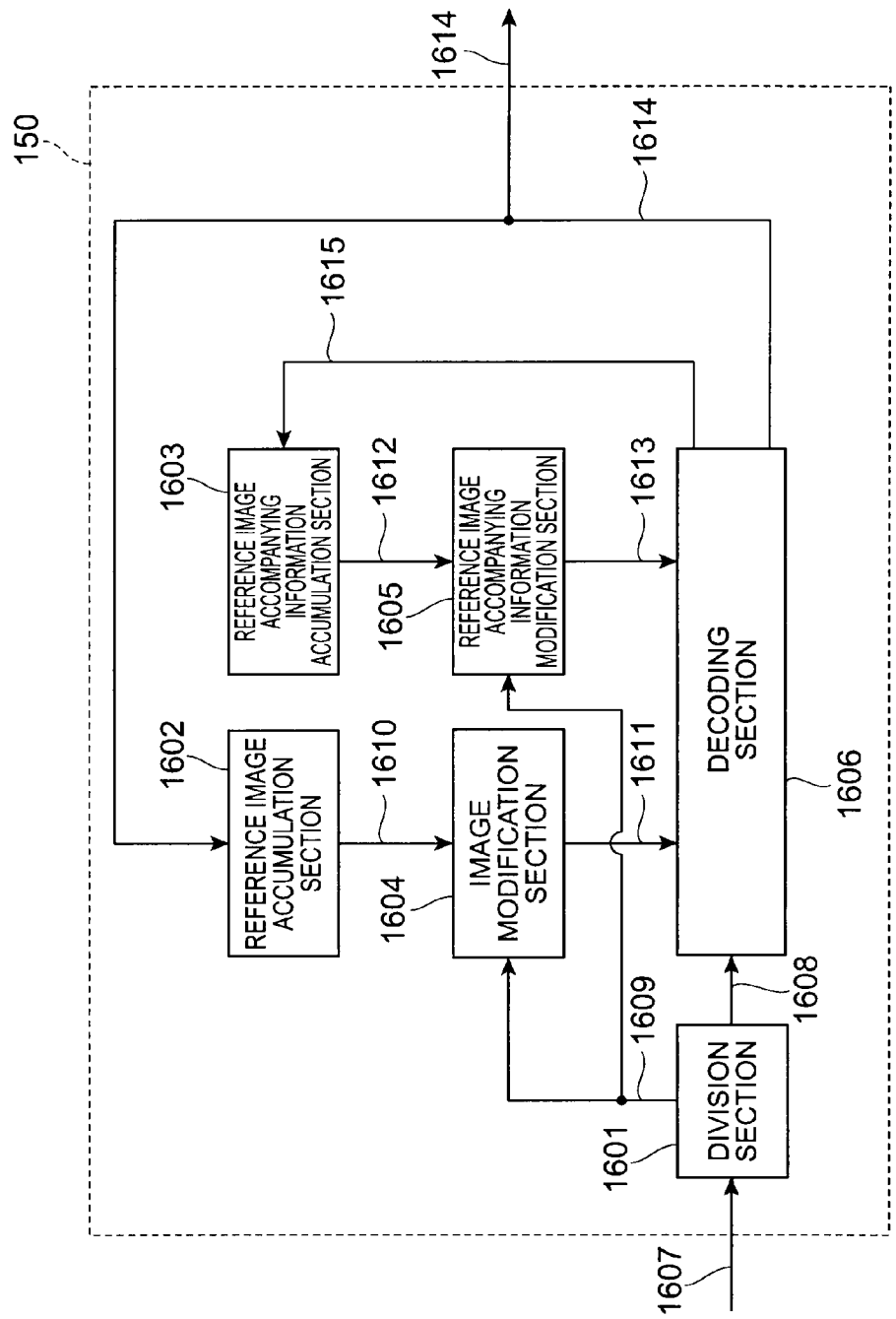
FIG. 17 is a constitutional view of a moving image decoding device according to the first modified example of the second embodiment of the present invention.

The moving image decoding device according to the present invention will be described next by using FIG. 17.

A moving image decoding device 150 according to the present invention is constituted comprising, as functional constituent elements, a division section 1601, a reference image accumulation section 1602, a reference image accompanying information accumulation section 1603, an image modification section 1604, a reference image accompanying information modification section 1605, and a decoding section 1606.

The division section 1601 divides the encoded data 1607 that are input after being transmitted from the outside into compressed data 1608 and modification method information 1609. The division section 1601 sends the compressed data 1608 to the decoding section 1606. In addition, the division section 1601 sends the modification method information 1609 to the image modification section 1604 and the reference image accompanying information modification section 1605.

The reference image accumulation section 1602 is a part which accumulates the reference image which is a previously decoded image. The reference image accumulation section 1602 sends the reference image 1610 to the image modification section 1604.

The image modification section 1604 uses the modification method information 1609 sent by the division section 1601 to modify the reference image 1610 sent by the reference image accumulation section 1602 to match the input image and generate the modified reference image 1611 which the image inversion section 1604 then sends to the decoding section 1606. Thus, the image reverse modification section in the moving image decoding device 150 of the present invention can be omitted.

The reference image accompanying information accumulation section 1603 is a part which accumulates the reference image accompanying information which is information accompanying the reference image which is a previously decoded image. The reference image accompanying information accumulation section 1603 sends reference image accompanying information 1612 to the reference image accompanying information modification section 1605.

The reference image accompanying information modification section 1605 uses the modification method information 1609 sent by the division section 1601 to modify the reference image accompanying information 1612 sent by the reference image accompanying information accumulation section 1603 and create modified reference image accompanying information 1613 which the reference image accompanying information modification section 1605 then sends to the decoding section 1606. Thus, the reference image accompanying information modification section 1605 uses the modification method information 1609 sent by the division section 1601 to create the modified reference image accompanying information 1613 and, therefore, the reference image accompanying information reverse modification section in the moving image decoding device 150 of the present invention can be omitted.

The decoding section 1606 uses the compressed data 1608 sent by the division section 1601, the modified reference image 1611 sent by the image modification section 1604, and the modified reference image accompanying information 1613 sent by the reference image accompanying information modification section 1605 to generate a predictive signal for the decoded image and decode the decoded image. The decoding section 1606 sends the decoded image 1614 which has been decoded to the reference image accumulation section 1602 for use as a reference image in the next frame and subsequent frames. Furthermore, the decoding section 1206 outputs the decoded image 1614 which has been decoded to an external device (not shown) such as a moving image display device. In addition, the decoding section 1606 sends decoded image accompanying information 1615 to the reference image accompanying information accumulation section 1603 for use as reference image accompanying information in the next frame and subsequent frames.

The modification method is not limited to rotation, enlargement, or reduction of the image and the reference image accompanying information. A variety of modification methods including the image inversion of the first embodiment can also be employed.

In addition, as an example of a decoding system that is used by the decoding section 1606, the H.264/AVC decoding system may be cited. However, the decoding system is not limited to the H.264/AVC decoding system. Decoding methods of a variety of systems that perform decoding by generating a predictive signal of a decoded image from a reference image and the information accompanying the reference image can be applied.

The detailed description of the decoding section 1606 is the same as the detailed description of the decoding section 706 of the first embodiment.

Figure 18:
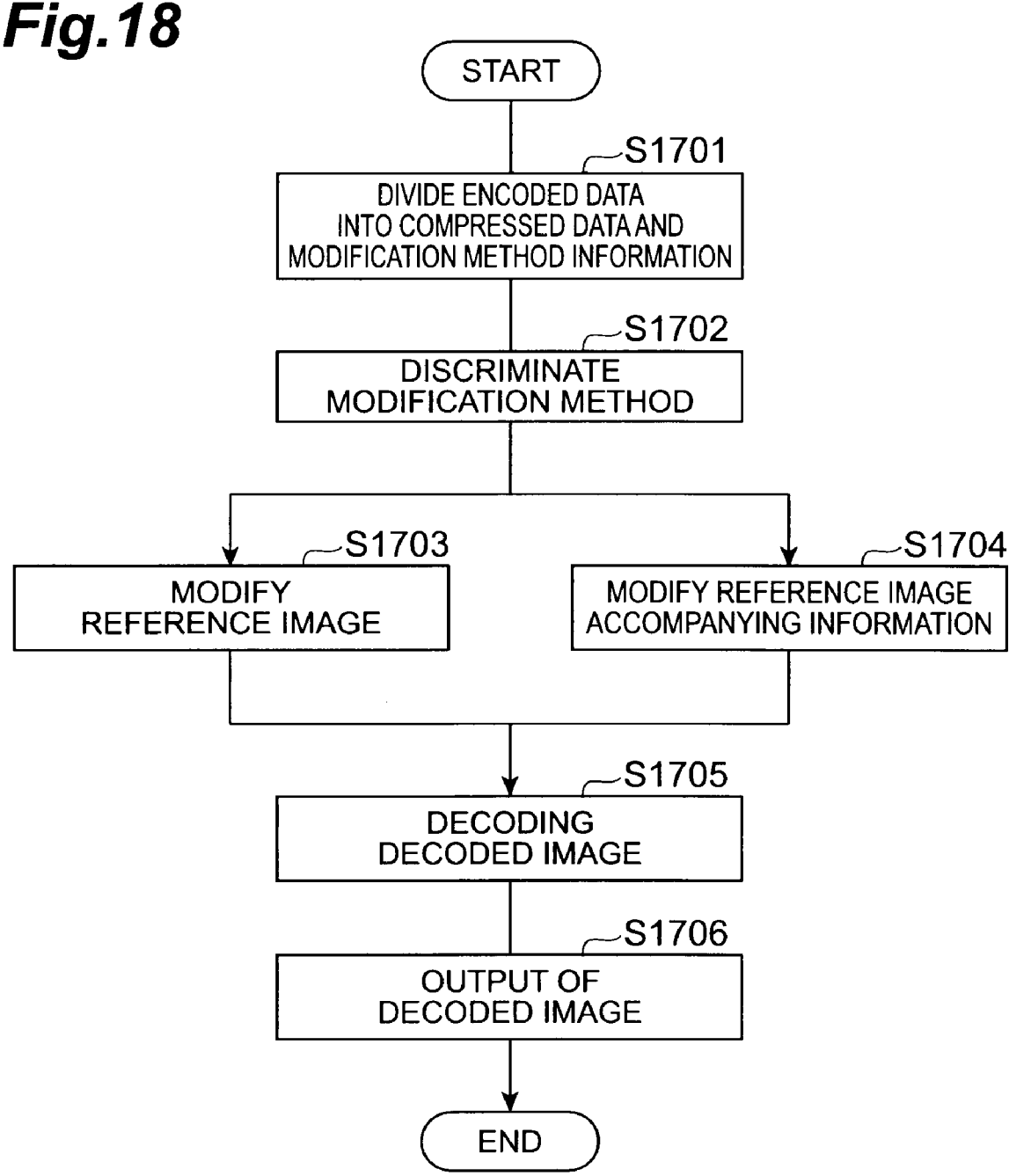
FIG. 18 is a flowchart showing a moving image decoding method according to the first modified example of the second embodiment of the present invention.

The operation of the moving image decoding device 150 according to the present invention will be described next by using FIG. 18. The operation of the moving image decoding device 150 according to the present invention can be executed by a program.

First, the division section 1601 divides the encoded data 1607 that are input after being transmitted from the outside into the compressed data 1608 and modification method information 1609 (step S1701) and discriminates the modification method (step S1702).

Thereafter, the image modification section 1604 uses the modification method information 1609 sent by the division section 1601 to modify the reference image 1610 sent by the reference image accumulation section 1602 and generate the modified reference image 1611 (step S1703). In addition, the reference image accompanying information modification section 1605 uses the modification method information 1609 sent by the division section 1601 to modify the reference image accompanying information 1612 sent by the reference image accompanying information accumulation section 1603 and create the modified reference image accompanying information 1613 (step S1704).

Thereafter, the decoding section 1606 uses the compressed data 1608 sent by the division section 1601, a modified reference image 1611 sent by the image modification section 1604, and modified reference image accompanying information 1613 sent by the reference image accompanying information modification section 1605 to generate a predictive signal for the decoded image and decode the decoded image (step S1705). In addition, the decoding section 1606 outputs the decoded image 1614 which has been decoded to an external device (not shown) such as a moving image display device (step 1706).

According to Modified example 1 of the second embodiment, the image modification section compares the input image and the reference image and generates a predictive signal by modifying the reference image and the information accompanying the reference image in accordance with the input image. The input image can therefore be encoded highly efficiently. In addition, a decoded image can be correctly decoded by generating a predictive signal by modifying the reference image and the information accompanying the reference image in accordance with transmitted modification method information. That is, image encoding and decoding can be performed more efficiently by generating an exact predictive signal.

INDUSTRIAL APPLICABILITY

The moving image encoding device, moving image decoding device, moving image encoding method, moving image decoding method, moving image encoding program, and moving image decoding program of the present invention make it possible to encode and decode image information more efficiently by generating an exact predictive signal.

The invention claimed is:

1. A moving image encoding device, comprising:
an input section configured to receive an input image as an encoding target;
a reference image accumulation section configured to accumulate a reference image;
a reference image accompanying information accumulation section configured to accumulate a motion vector accompanying the reference image;
an encoding section configured to invert the reference image and the motion vector of the reference image in accordance with the input image, generate a predictive signal for the input image, and encode the input image; and
an output section configured to output, as encoded data, compressed data obtained by encoding by the encoding section together with modification method information indicating a modification method for the reference image.

2. The moving image encoding device according to claim 1, further comprising:
an image reverse inversion section configured to reverse-invert a locally decoded image that has been locally decoded by the encoding section; and
a reference image accompanying information reverse inversion section configured to reverse-invert a motion vector that accompanies the locally decoded image output by the encoding section,
wherein the reference image accumulation section accumulates information that has been reverse-inverted by the image reverse inversion section as the reference image; and
the reference image accompanying information accumulation section accumulates information that has been reverse-inverted by the reference image accompanying information reverse inversion section as the motion vector of the reference image.

3. A moving image encoding device, comprising:
an input section configured to receive an input image as an encoding target;
a reference image accumulation section configured to accumulate a reference image;
a reference image accompanying information accumulation section configured to accumulate a motion vector that accompanies the reference image;
an image inversion section configured to invert the input image and the reference image;
a reference image accompanying information inversion section configured to invert the motion vector in accordance with the input image and the reference image;
an encoding section configured to generate a predictive signal for the input image using the inverted reference image and the inverted motion vector, and encode the input image; and
an output section configured to output, as encoded data, compressed data obtained by encoding by the encoding section together with modification method information indicating a modification method for the reference image.

4. The moving image encoding device according to claim 3, further comprising:
an image reverse inversion section configured to reverse-invert a locally decoded image that has been locally decoded by the encoding section; and
a reference image accompanying information reverse inversion section configured to reverse-invert a motion vector that accompanies the locally decoded image output by the encoding section,
wherein the reference image accumulation section accumulates information that has been reverse-inverted by the image reverse inversion section as the reference image; and
the reference image accompanying information accumulation section accumulates information that has been reverse-inverted by the reference image accompanying information reverse inversion section as the motion vector of the reference image.

5. A moving image decoding device, comprising:
a division section configured to divide encoded data that has been input into compressed data and modification method information;
a reference image accumulation section configured to accumulate a reference image;
a reference image accompanying information accumulation section configured to accumulate a motion vector accompanying the reference image; and
a decoding section configured to invert the reference image and the motion vector using the modification method information, generate a predictive signal for a decoded image, and decode the decoded image.

6. The moving image decoding device according to claim 5, further comprising:
an image reverse inversion section configured to reverse-invert a decoded image that has been decoded by the decoding section; and
a reference image accompanying information reverse inversion section configured to reverse-invert a motion vector that accompanies the decoded image output by the decoding section,
wherein the reference image accumulation section accumulates the information that has been reverse-inverted by the image reverse inversion section as the reference image; and
the reference image accompanying information accumulation sections accumulates information that has been reverse-inverted by the reference image accompanying information reverse inversion section as the motion vector accompanying the reference image.

7. A moving image decoding device, comprising:
a division section configured to divide encoded data that has been input into compressed data and modification method information;
a reference image accumulation section configured to accumulate a reference image;
a reference image accompanying information accumulation section configured to accumulate a motion vector accompanying the reference image;
an image inversion section configured to invert the reference image in accordance with the modification method information;
a reference image accompanying information inversion section configured to invert the motion vector in accordance with the modification method information; and a decoding section configured to generate a predictive signal for a decoded image using the inverted reference image and the inverted motion vector, and decode the decoded image.

8. The moving image decoding device according to claim 7, further comprising:
an image reverse inversion section configured to reverse-invert a decoded image decoded by the decoding section; and
a reference image accompanying information reverse inversion section configured to reverse-invert a motion vector that accompanies the decoded image output by the decoding section,
wherein the reference image accumulation section accumulates the information that has been reverse-inverted by the image reverse inversion section as the reference image; and
the reference image accompanying information accumulation section accumulates the information that has been reverse-inverted by the reference image accompanying information reverse inversion section as the motion vector accompanying the reference image.

9. A moving image encoding method, comprising:
receiving an image as an encoding target;
accumulating a reference image;
accumulating a motion vector that accompanies the reference image;
inverting the reference image and the motion vector in accordance with the input image;
generating a predictive signal for the input image;
encoding the input image; and
outputting, as encoded data, compressed data obtained by encoding in the encoding together with modification method information indicating a modification method for the reference image.

10. A moving image encoding method, comprising:
receiving an image as an encoding target;
accumulating a reference image;
accumulating a motion vector that accompanies the reference image;
inverting the input image and the reference image;
inverting the motion vector in accordance with the input image and the reference image;
generating a predictive signal for the input image using the inverted reference image and the inverted motion vector;
encoding the input image; and
outputting, as encoded data, compressed data obtained by encoding in the encoding together with modification method information indicating a modification method for the reference image.

11. A moving image decoding method, comprising:
dividing received encoded data into compressed data and modification method information;
accumulating a reference image;
accumulating a motion vector that accompanies the reference image;
inverting the reference image and the motion vector using the modification method information;
generating a predictive signal for a decoded image; and
decoding the decoded image.

12. A moving image decoding method, comprising:
dividing received encoded data into compressed data and modification method information;
accumulating a reference image;
accumulating a motion vector that accompanies the reference image;
inverting the reference image in accordance with the modification method information;
inverting the motion vector in accordance with the modification method information;
generating a predictive signal for a decoded image using the inverted reference image and the inverted motion vector; and
decoding the decoded image.

13. A non-transitory computer-readable medium including a computer program, which when executed by a computer, causes the computer to perform a method comprising:
receiving an image as an encoding target;
accumulating a reference image;
accumulating a motion vector that accompanies the reference image;
inverting the reference image and the motion vector in accordance with the input image;
generating a predictive signal for the input image;
encoding the input image; and
outputting, as encoded data, compressed data obtained by the encoding together with modification method information indicating a modification method for the reference image.

14. A non-transitory computer-readable medium including a computer program, which when executed by a computer, causes the computer to perform a method comprising:
dividing received encoded data into compressed data and modification method information;
accumulating a reference image;
accumulating a motion vector that accompanies the reference image;
inverting the reference image and the motion vector using the modification method information;
generating a predictive signal for a decoded image; and
decoding the decoded image.

* * * * *